US008665263B2

(12) United States Patent
Yoshida et al.

(10) Patent No.: US 8,665,263 B2
(45) Date of Patent: Mar. 4, 2014

(54) AERIAL IMAGE GENERATING APPARATUS, AERIAL IMAGE GENERATING METHOD, AND STORAGE MEDIUM HAVING AERIAL IMAGE GENERATING PROGRAM STORED THEREIN

(75) Inventors: Mitsunobu Yoshida, Tokyo (JP); Masakazu Miya, Tokyo (JP); Yoshihiro Shima, Tokyo (JP); Junichi Takiguchi, Tokyo (JP); Ryujiro Kurosaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 13/060,444

(22) PCT Filed: Aug. 24, 2009

(86) PCT No.: PCT/JP2009/064700
§ 371 (c)(1),
(2), (4) Date: Feb. 24, 2011

(87) PCT Pub. No.: WO2010/024212
PCT Pub. Date: Mar. 4, 2010

(65) Prior Publication Data
US 2011/0164037 A1 Jul. 7, 2011
US 2011/0310091 A2 Dec. 22, 2011

(30) Foreign Application Priority Data
Aug. 29, 2008 (JP) ................. 2008-221359

(51) Int. Cl.
*G06T 15/00* (2011.01)
(52) U.S. Cl.
USPC ....................................... 345/419
(58) Field of Classification Search
USPC ....................................... 345/419
See application file for complete search history.

(56) References Cited

U.S. PATENT DOCUMENTS 7,242,460 B2 * 7/2007 Hsu et al. .................. 356/4.01
7,822,266 B2 * 10/2010 Wellington et al. ........... 382/154

(Continued)

FOREIGN PATENT DOCUMENTS

JP    2003 156330    5/2003
JP    2006 323608    11/2006

(Continued)

OTHER PUBLICATIONS

Gumhold et al., "Feature Extraction From Point Clouds," Proceedings of 10th International Meshing Roundtable (vol. 2001).*

(Continued)

*Primary Examiner* — Kee M Tung
*Assistant Examiner* — Richard M Russell
(74) *Attorney, Agent, or Firm* — Oblon, Spivak, McClelland, Maier & Neustadt, L.L.P.

(57) ABSTRACT

An apparatus and method generating a road image including no features such as trees and tunnels hiding or covering a road surface. A mobile measuring apparatus installed in a vehicle may acquire a distance and orientation point cloud, a camera image, GPS observation information, a gyro measurement value, and an odometer measurement value, while moving in a target area. The position and attitude localizing apparatus may localize the position and attitude of the vehicle based on the GPS observation information, the gyro measurement value and the odometer measurement value. The point cloud generating apparatus may generate a point cloud based on the camera image, the distance and orientation point cloud, and a position and attitude localized value. The point cloud orthoimage generating apparatus may extract points close to a road surface exclusively from the point cloud by removing points higher than the road surface, orthographically project each extracted point onto a horizontal plane, and generate a point cloud orthoimage. The point cloud orthoimage may show the road surface including no features covering or hiding the road surface.

19 Claims, 27 Drawing Sheets

(56) References Cited

U.S. PATENT DOCUMENTS

| | | | |
|---|---|---|---|
| 7,822,541 B2* | 10/2010 | Kumagai et al. | 701/436 |
| 8,294,712 B2* | 10/2012 | Nelson | 345/421 |
| 2007/0065002 A1* | 3/2007 | Marzell et al. | 382/154 |
| 2011/0109618 A1* | 5/2011 | Nowak et al. | 345/419 |

FOREIGN PATENT DOCUMENTS

| | | |
|---|---|---|
| JP | 2007 218705 | 8/2007 |
| WO | WO 2008/099915 A1 | 8/2008 |

OTHER PUBLICATIONS

Fruh, Christian, and Avideh Zakhor. "3D model generation for cities using aerial photographs and ground level laser scans." Computer Vision and Pattern Recognition, 2001. CVPR 2001. Proceedings of the 2001 IEEE Computer Society Conference on. vol. 2. IEEE, 2001.*

Kawata, H., et al., "Image-Based Point Rendering for Multiple Range Data," IPSJ SIG Technical Report, Information Processing Society of Japan, pp. 13-18, (Aug. 18, 2003) (with English language translation).

International Search Report issued Sep. 29, 2009 in PCT/JP09/064700 filed Aug. 24, 2009.

Japanese Office Action issued May 24, 2011, in Patent Application No. 2010-526690 (with English-language translation).

Korean Office Action issued Aug. 2, 2012, in Korea patent application No. 10-2011-7003641 (with English translation).

Chinese Office Action issued Oct. 22, 2012, in China Patent Application No. 200980133675.0 (with English translation).

Office Action issued Apr. 23, 2013 in Japanese Patent Application No. 2011-159907 (with English Translation).

* cited by examiner

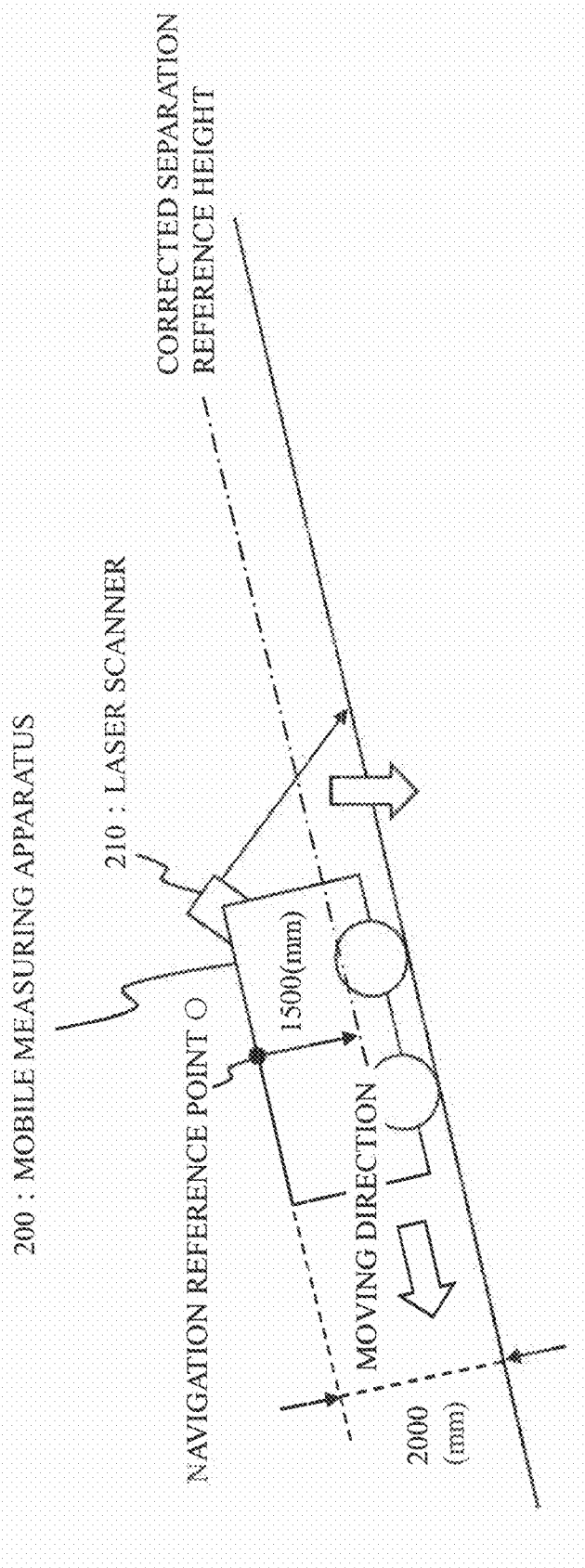

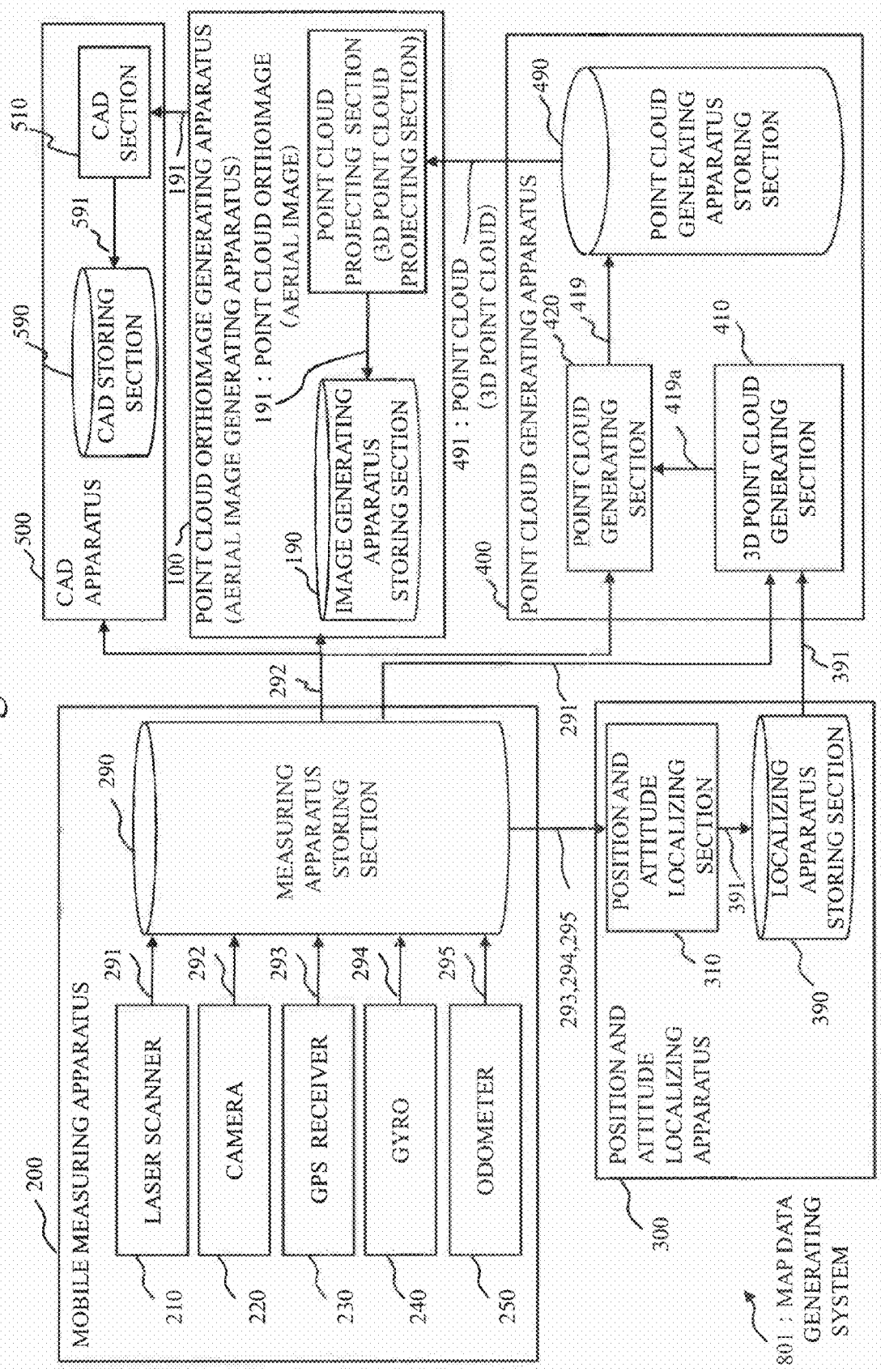

AERIAL IMAGE GENERATING APPARATUS, AERIAL IMAGE GENERATING METHOD, AND STORAGE MEDIUM HAVING AERIAL IMAGE GENERATING PROGRAM STORED THEREIN

TECHNICAL FIELD

The present invention relates to an aerial image generating apparatus, an aerial image generating method, and an aerial image generating program for generating a road orthoimage by using a colored laser point cloud, for example.

BACKGROUND ART

A laser point cloud indicating distance and orientation measured by a laser scanner reproduces the 3D shape of a feature on the ground. A larger number of laser points make a 3D shape more accurate, and therefore a vast number of laser points are acquired.

However, the laser point cloud includes a point cloud obtained by measuring a feature that is not intended for reproduction. Therefore, there is a need of extracting the laser point cloud obtained by measuring a feature intended for reproduction from massive laser points.

Laser point clouds have been extracted by the following methods:
(1) A laser point cloud is viewed in a three dimensional manner, and a point is extracted if necessary with visual confirmation; and
(2) A laser point cloud is superimposed on a camera image on a display to help identify a target feature, and a point is extracted if necessary with visual confirmation.

The method (1) however poses the following problems, for example:
(A) Laser points need to be designated one by one for extraction; and
(B) Extracted laser points cannot be used directly on CAD (Computer Aide Design).

The method (2) poses the following problems, for example:
(A) A target feature can be identified only by a laser point cloud showing points arranged in the direction of the field of vision of the camera;
(B) It takes time and labor to select an appropriate camera image; and
(C) It is hard to identify the place where a target feature is located.

Those introduced methods require visual confirmation for each point to be extracted, which takes time. On the other hand, automatic recognition techniques have been under development. With the automatic recognition, recognizable features are limited and the recognition rate is not sufficient enough. Also, visual confirmation is required for correction.

PRIOR ART REFERENCE

Patent Document

Patent Document 1: JP 2007-218705 A

SUMMARY OF THE INVENTION

Problems to be Solved by the Invention

An objective of the present invention is to remove unnecessary points from a massive number of acquired laser points, and extract necessary laser points exclusively, for example.

Means to Solve the Problems

According to one aspect of the present invention, an aerial image generating apparatus may generate an aerial image of a ground surface by using a 3D point cloud indicating 3D coordinates of a spot on the ground. The aerial image generating apparatus may include a 3D point cloud projecting section that is configured to generate the aerial image by projecting each point of the 3D point cloud onto a plane based on the 3D coordinates of each point indicated by the 3D point cloud by using CPU (Central Processing Unit).

The aerial image generating apparatus may further include a predetermined height point cloud extracting section that is configured to extract from the 3D point cloud as a predetermined height point cloud a point whose height is within a predetermined height range based on the 3D coordinates of each point indicated by the 3D point cloud, by using CPU, The 3D point cloud projecting section may generate the aerial image by projecting each point of the predetermined height point cloud onto the plane based on the 3D coordinates indicated by each point of the predetermined height point cloud extracted from the 3D point cloud by the predetermined height point cloud extracting section, by using CPU.

The aerial image generating apparatus may further include a point density calculating section configured to calculate a point density of each point of the 3D point cloud projected onto the plane by the 3D point cloud projecting section for each zone of the plane divided into zones of a predetermined size, by using CPU; a standing feature specifying section configured to specify an image portion of the aerial image showing a standing feature based on the point density calculated by the point density calculating section, by using CPU; and a standing feature discriminating section configured to generate the aerial image in which the image portion specified by the standing feature specifying section is discriminated from other image portions, by using CPU.

Advantageous Effects of the Invention

According to the present invention, it is allowed to extract a laser point cloud (a predetermined height point cloud) indicating a road surface without visual confirmation, and generate an aerial image of a road including no features such as tunnels and trees hiding or covering the road surface, for example.

It is also allowed to extract a laser point cloud indicating a standing feature such as a power pole without visual confirmation, and generate an aerial image in which a standing feature is discriminated from a road surface, for example.

BRIEF DESCRIPTION OF THE DRAWINGS

FIG. 18 shows an enlarged view of a part of the target area a;

FIG. 26 illustrates a method for specifying the ground height 139a according to the fourth embodiment (Example 3 (2)); and FIG. 27 shows a configuration of a map data generating system 801 according to a fifth embodiment.

DESCRIPTION OF EMBODIMENTS

Embodiment 1

An aerial image generating apparatus that generates an aerial image of the ground based on a 3D point cloud indicating the 3D coordinates of each point on the ground will be described according to a first embodiment.

Figure 1:
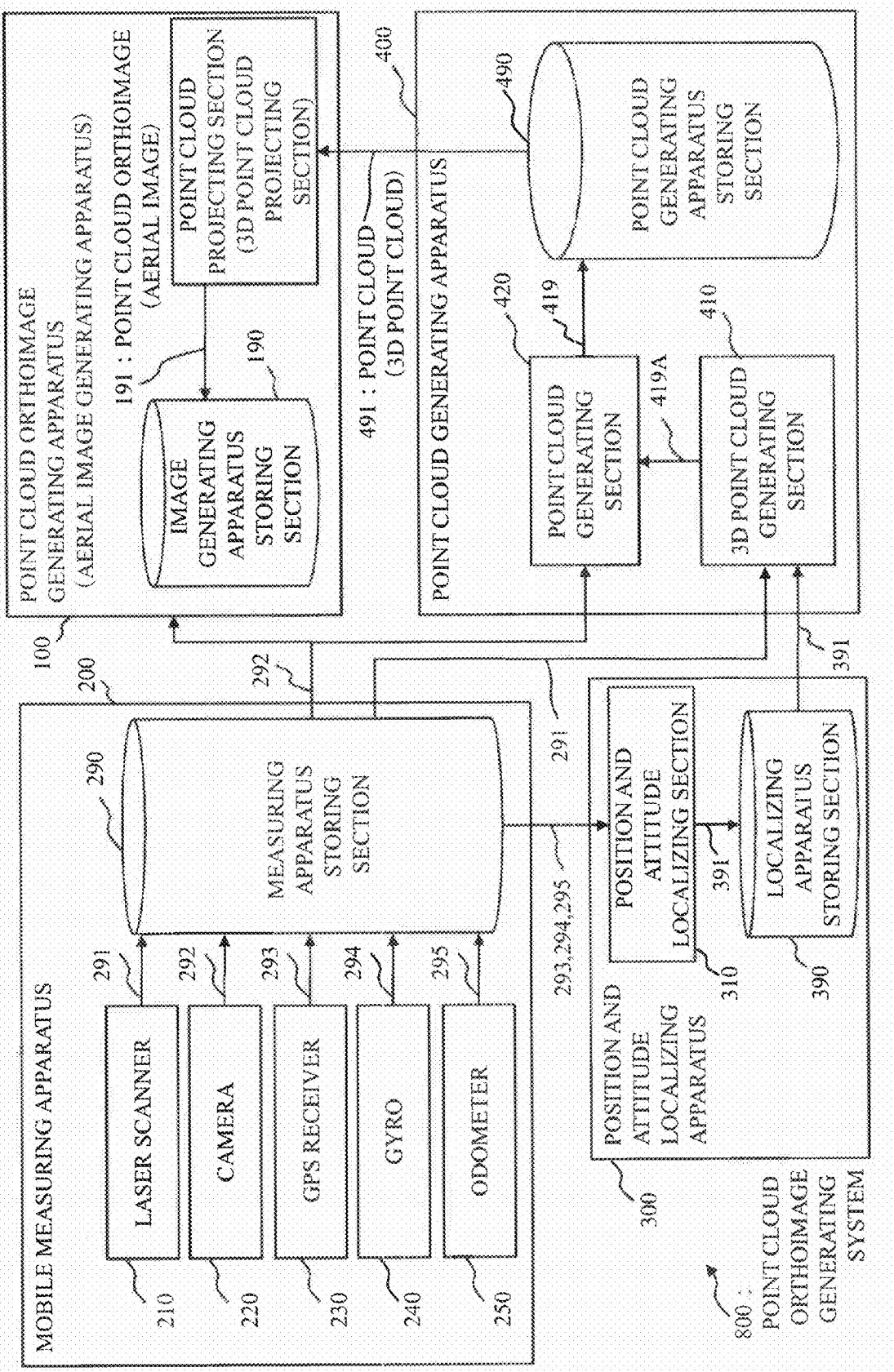
FIG. 1 shows a configuration of a point cloud orthoimage generating system 800 according to a first embodiment.

FIG. 1 shows a configuration of a point cloud orthoimage generating system 800 according to the first embodiment.

The configuration of the orthoimage generating system 800 of the first embodiment will be discussed with reference to FIG. 1.

The orthoimage generating system 800 includes a mobile measuring apparatus 200, a position and attitude localizing apparatus 300, a point cloud generating apparatus 400, and a point cloud orthoimage generating apparatus 100.

The mobile measuring apparatus 200 may be a mobile object (e.g., a vehicle or airplane) equipped with a laser scanner 210, a camera 220, a GPS receiver 230, a gyro 240, and an odometer 250.

The mobile measuring apparatus 200 acquires various kinds of measurement data as the base of a 3D point cloud while moving on the ground (or in the air).

The laser scanner 210 irradiates a laser beam towards a point on the ground and then observes a laser pulse reflected off a feature at the point. The laser scanner 210 measures the orientation of the feature based on the direction of laser irradiation, and also measures the distance to the feature based on a period of time delay between irradiation of laser and detection of reflected laser.

The laser scanner 210 is also called a laser radar or a laser rangefinder (LRF).

Hereinafter, point cloud data indicating distance and orientation to a feature at each point measured by a laser scanner 210, and a direction of laser irradiation will be referred to as a "distance and orientation point cloud 291".

The camera 220 takes a picture of a feature at the site of measurement of the laser scanner 210 (the point where the mobile measuring apparatus 200 is located at the time of a laser observation by the laser scanner 210) at the same time as the laser scanner 210 measures the distance and orientation point cloud 291.

Hereinafter, image data taken by the camera 220 will be referred to as a camera image 292.

The GPS receiver 230 observes positioning signals transmitted from a plurality of Global Positioning System (GPS) satellites at the same time as the laser scanner 210 measures the distance and orientation point cloud 291. The GPS receiver 230 then acquires information such as a navigation message indicated by a positioning signal, the phase of a carrier wave to be used for carrying a positioning signal, a pseudo distance indicating distance between the GPS receiver 230 and a GPS satellite calculated based on the transfer time of a positioning signal, and a positioning result calculated based on the pseudo distance.

Hereinafter, the information acquired by the GPS receiver 230 will be referred to as "GPS observation information 293".

The gyro 240 measures an angular velocity in the three axial directions (Roll, Pitch, and Yaw) of the mobile measuring apparatus 200 at the same time as the laser scanner 210 measures the distance and orientation point cloud 291.

Hereinafter, the angular velocity in the three axial direction measured by the gyro 240 will be referred to as a "gyro measurement value 294".

The odometer 250 measures the amount of change in velocity of the mobile measuring apparatus 200 at the same time as the laser scanner 210 measures the distance and orientation point cloud 291.

Hereinafter, the amount of change in velocity measured by the odometer 250 will be referred to as an "odometer measurement value 295".

A measuring apparatus storing section 290 stores the distance and orientation point cloud 291, the camera image 292, the GPS observation information 293, the gyro measurement value 294, and the odometer measurement value 295.

The distance and orientation point cloud 291, the camera image 292, the GPS observation information 293, the gyro measurement value 294, and the odometer measurement value 295 each indicate a measurement time, and are correlated with one another by the measurement time.

Figure 2:
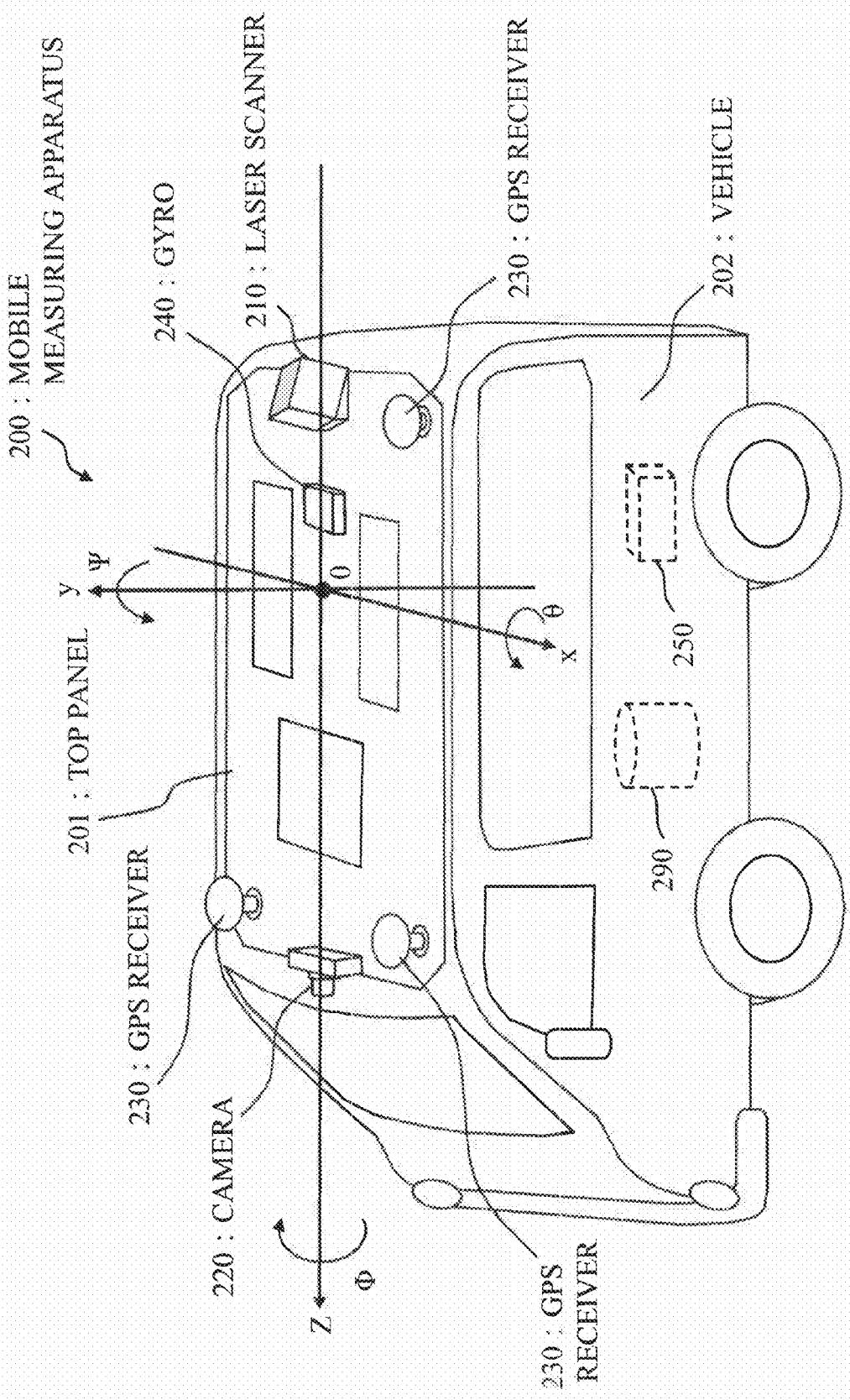
FIG. 2 shows an external view of a mobile measuring apparatus 200 according to the first embodiment.

FIG. 2 shows an external view of the mobile measuring apparatus 200 according to the first embodiment.

For example, the mobile measuring apparatus 200 may be built as a vehicle 202 as shown in FIG. 2.

The laser scanner 210, the camera 220, the GPS receiver 230, and the gyro 240 are installed and secured to a top panel 201 placed on a top portion of the vehicle 202. The odometer 250 is placed in the vehicle 202. The figure shows an installation example of the laser scanner 210 and the camera 220, which may alternatively be installed at a front or rear portion of the vehicle 202.

The vehicle 202 moves around on the roads in a target area of measurement.

The laser scanner 210 is installed at a rear portion of the vehicle 202. The laser scanner 210 irradiates laser beams towards the backside and the lateral side of the vehicle 202 while oscillating substantially at 240 degrees in the width direction of the vehicle 202 (in the x-axis direction). The laser scanner 210 then observes returned laser beams reflected from features locating behind the vehicle 202 or in the lateral direction of the vehicle 202, and acquires the distance and orientation point cloud 291 of measured features in the target area of measurement.

The camera 220 is installed at a front portion of the vehicle 202. The camera 220 repeats taking pictures in the moving direction of the vehicle 202 (in the z-axis direction), and acquires the camera image 292 of the target area of measurement.

The GPS receivers 230 are installed at three locations on the top panel 201, and each acquire the GPS observation information 293 from a positioning signal received from a GPS satellite.

The gyro 240 measures the angular velocity of x-axis, y-axis, and z-axis of the vehicle 202 to acquire the gyro measurement value 294.

The odometer 250 measures the amount of change in velocity of the mobile measuring apparatus 200 by counting the rotations of the wheels to acquire the odometer measurement value 295.

Referring to FIG. 2, a point O indicates the coordinate center of the mobile measuring apparatus 200 (hereinafter, referred to as a navigation reference point). The coordinates of the mobile measuring apparatus 200 means the coordinates of the point O. An amount of displacement (hereinafter, referred to as offset) to a point O from each of the laser scanner 210, the camera 220, the GPS receiver 230, and the gyro 240 is measured in advance. The coordinates of each of the laser scanner 210, the camera 220, the GPS receiver 230, and the gyro 240 can be obtained by adding the offset to the coordinates of the point O.

Hereinafter, a description will be given by assuming that the coordinates of each of the laser scanner 210, the camera 220, the GPS receiver 230, and the gyro 240 match the point O, and are equivalent to the coordinates of the mobile measuring apparatus 200.

The line of sight of the camera 220 is assumed to be equivalent to the attitude angle of the mobile measuring apparatus 200.

Referring to FIG. 1, the position and attitude localizing apparatus 300 includes a position and attitude localizing section 310 and a localizing apparatus storing section 390, and calculates the position and attitude of the mobile measuring apparatus 200 at the time of measurement.

The position and attitude localizing section 310 calculates the position (latitude, longitude, and height [altitude]) (East, North, and Up) and the attitude angle (a roll angle, a pitch angle, and a yaw angle) of the mobile measuring apparatus 200 at the time of measurement by using Central Processing Unit (CPU) based on the GPS observation information 293, the gyro measurement value 294 and the odometer measurement value 295 acquired from the mobile measuring apparatus 200.

For example, the position and attitude localizing section 310 treats the positioning result included in the GPS observation information 293 as the position of the mobile measuring apparatus 200.

Alternatively, however, the position and attitude localizing section 310 may calculate a pseudo-distance based on the phase of a carrier wave included in the GPS observation information 293, and then calculate the position of the mobile measuring apparatus 200 based on the calculated pseudo-distance.

Still alternatively, the position and attitude localizing section 310 may calculate the position and attitude angle of the mobile measuring apparatus 200 by dead reckoning based on the gyro measurement value 294 and the odometer measurement value 295. Dead reckoning is a method for estimating the current position and attitude angle of an object by integrating the angular velocity of an attitude angle with a moving speed to obtain amount of change from a past time, and then adding the amount of change to a past position and attitude angle.

Hereinafter, the position and attitude angle of the mobile measuring apparatus 200 calculated by the position and attitude localizing section 310 will be referred to as a "position and attitude localized value 391". The position and attitude localized value 391 indicates the position and attitude angle of the mobile measuring apparatus 200 at each time.

The localizing apparatus storing section 390 stores the position and attitude localized value 391.

The point cloud generating apparatus 400 includes a 3D point cloud generating section 410, a point cloud generating section 420, and a point cloud generating apparatus storing section 490. The point cloud generating apparatus 400 generates a 3D point cloud indicating the 3D coordinates and color of each point on the ground.

The 3D point cloud generating section 410 generates a 3D point cloud 419a by using CPU based on the distance and orientation point cloud 291 acquired by the mobile measuring apparatus 200 and the position and attitude localized value 391 calculated by the position and attitude localizing apparatus 300. More specifically, the 3D point cloud generating section 410 generates the 3D point cloud 419a indicating the 3D coordinates of each point of the distance and orientation point cloud 291 by extracting the position and attitude of the mobile measuring apparatus 200 of each point of the distance and orientation point cloud 291 at each time of measurement from the position and attitude localized value 391, and then calculating the 3D coordinates of a point away from the extracted position and attitude by the distance and orientation of each point.

The point cloud generating section 420 generates the point cloud 491 by using CPU based on 3D point cloud 419a generated by the 3D point cloud generating section 410 and the camera image 292 acquired by the mobile measuring apparatus 200. The point cloud 491 shows color in addition to 3D coordinates for each point, and is therefore called a colored laser point cloud.

More specifically, the point cloud generating section 420 calculates as an imaging plane of the camera 220 a plane orthogonal to an imaging direction at a position away from the position where the image was taken by a focal distance in the imaging direction (in the line of sight of the camera 220). The imaging plane is equal to the plane of the camera image 292. The point cloud generating section 420 projects each point of the 3D point cloud 419a onto the camera image 292 (an imaging plane) based on the 3D coordinates of each point of the 3D point cloud 419a, and treats the color of each point as the color of the pixel of the camera image 292 onto which each point is projected.

The point cloud generating apparatus storing section 490 stores the point cloud 491.

The point cloud orthoimage generating apparatus 100 (an example of an aerial image generating apparatus) includes a point cloud projecting section 110 and an image generating apparatus storing section 190. The orthoimage generating apparatus 100 generates an aerial image of a target area based on the point cloud 491.

The point cloud projecting section 110 generates an aerial image of a target area by using CPU based on the point cloud 491 generated by the point cloud generating apparatus 400. Specifically, the point cloud projecting section 110 calculates a horizontal plane corresponding to the latitude and longitude of the target area, and orthographically projects each point of the point cloud 491 onto a calculated horizontal plane based on the 3D coordinates of each point. More specifically, the point cloud projecting section 110 treats the 3D coordinates (x, y, z) of each point of the point cloud 491 as "z (height)=0", and arranges each point at a part of the horizontal plane corresponding to the 2D coordinates (x, y).

For example, the point cloud projecting section 110 calculates an imaging plane, assuming that the image has been taken by a camera directed vertically downward a predetermined position up in the sky above the target area, and orthographically projects each point of the point cloud 491 onto a calculated imaging plane. The 3D coordinates of the predetermined viewpoint are the latitude and longitude of the center of the measuring area, and a predetermined height. Each point of the point cloud 491 is projected onto a part of an imaging plane having the same latitude and longitude.

The horizontal plane onto which each point of the point cloud 491 is orthographically projected shows an image of the measured area viewed vertically downward from the sky.

Hereinafter, a Bitmap image on a horizontal plane onto which each of the point cloud 491 is orthographically projected will be referred to as a "point cloud orthoimage 191 (an example of an aerial image)".

Alternatively, however, the plane onto which each of the point cloud 491 is orthographically projected is not limited to the horizontal plane, and may be a plane inclined to the horizontal plane. In this case, the plane onto which each of the point cloud 491 is orthographically projected shows an image of the measuring area viewed diagonally downward from the sky (an example of an aerial image).

Still alternatively, the type of projection used for projecting the point cloud 491 by the point cloud projecting section 110 is not limited to the orthographical projection, and may be a center projection, for example.

Figure 3:
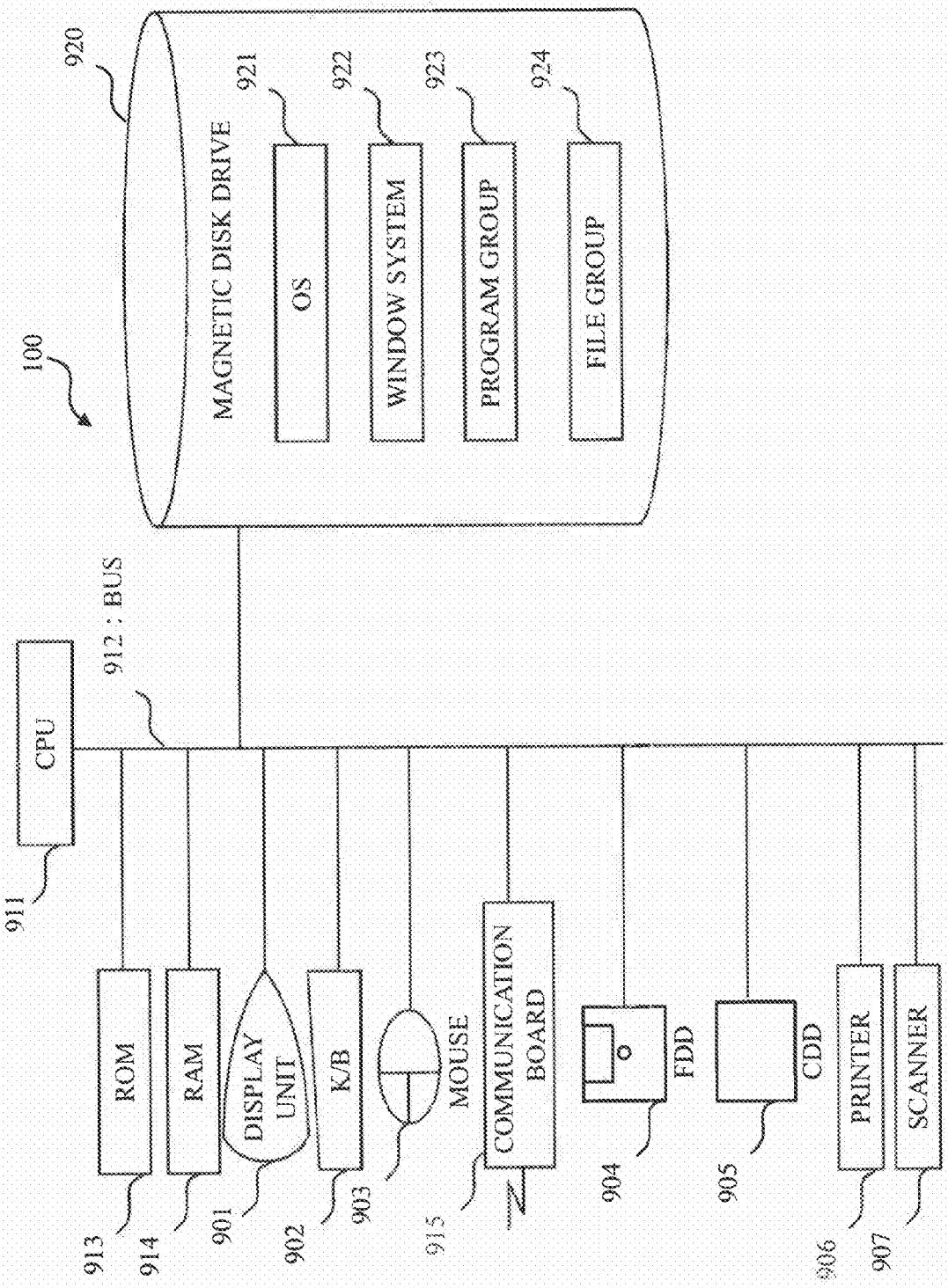
FIG. 3 shows an example of hardware resources of a point cloud orthoimage generating apparatus 100 according to the first embodiment.

FIG. 3 shows example hardware resources of the orthoimage generating apparatus 100 according to the first embodiment.

Referring to FIG. 3, the orthoimage generating apparatus 100 includes a CPU 911 (also called as a Central Processing Unit, a central processor, a processing unit, an arithmetic unit, a microprocessor, a microcomputer, or a processor). The CPU 911 is coupled to a ROM 913, a RAM 914, a communication board 915, a display unit 901, a keyboard 902, a mouse 903, a Flexible Disk Drive (FDD) 904, a compact disk drive (CDD) 905, a printer unit 906, a scanner unit 907, and a magnetic disk drive 920 via a bus 912, and controls those hardware devices. The magnetic disk drive 920 may be replaced by a storage device such as an optical disk drive, or a memory card read/write drive.

The RAM 914 is an example of a volatile memory. The storage media of the ROM 913, the FDD 904, the CDD 905, and the magnetic disk drive 920 are examples of nonvolatile memories. Those devices are examples of storage equipment, storage units, or storing sections.

The communication board 915, the keyboard 902, the scanner unit 907, the FDD 904 are examples of input equipment, input units, or input sections.

The communication board 915, the display unit 901, the printer unit 906 are examples of output equipment, output units, or output sections.

The communication board 915 is connected to a communication network such as a Local Area Network (LAN), the Internet, a Wide Area Network (WAN) such as ISDN, or a telephone line, with or without wires.

The magnetic disk drive 920 stores an Operating System (OS) 921, a window system 922, a program group 923, and a file group 924. The programs of the program group 923 are executed by the CPU 911, the OS 921, and the window system 922.

The program group 923 stores a program for executing a function described as a "section" in the description of this and the following embodiments. The program is read and executed by the CPU 911.

The file group 924 stores resultant data obtained by executing the function of a "section" such as a "judgment result", a "calculation result", a "processing result", or the like; data to be exchanged between programs for executing the functions of "sections"; other information; data; a signal value; a variable value; and a parameter described in this and the following embodiments, as an individual item as a "file" or a "database".

A "file" and a "database" are stored in a storage medium such as a disk or a memory. Information, data, a signal value, a variable value, and a parameter stored in a storage medium such as a disk or a memory are read into a main memory or a cache memory by the CPU 911 via a read/write circuit, and used in a CPU operation for extraction, search, reference, comparison, computation, calculation, processing, output, print, display, or the like. During a CPU operation for extraction, search, reference, comparison, computation, calculation, processing, output, print, display or the like, information, data, a signal value, a variable value, or a parameter is stored temporarily in a main memory, a cache memory, or a buffer memory.

An arrow shown in a flow chart described in this and the following embodiments primarily indicates an input/output of data or a signal. Data or a signal value is stored in a storage medium such as a memory of the RAM 914, a flexible disk of the FDD 904, a compact disk of the CDD 905, a magnetic disk of the magnetic disk drive 920, an optical disk, a mini disk, a Digital Versatile disc (DVD), or the like. Data or a signal value is transmitted online via the bus 912, a signal line, a cable, or other transmission media.

A "section" described in this and the following embodiments may be a "circuit", a "device", a "piece of equipment", or a "means". A "section" may otherwise be a "step", a "procedure", or a "process". More specifically, a "section" descried in this and the following embodiments may be implemented by firmware stored in the ROM 913. Alternatively, a "section" descried in this and the following embodiments may be implemented solely by software; or solely by hardware such as an elemental device, a device, a substrate, wiring or the like; or by a combination of software and hardware; or by a combination of software, hardware and firmware. Firmware and software may be stored as a program in a storage medium, such as a magnetic disk, a flexible disk, an optical disk, a compact disk, a mini disk, a DVD, or the like. A program is read and executed by the CPU 911. Specifically, a program causes a computer to function as a "section", or causes a computer to execute the procedure or method of a "section".

Like the orthoimage generating apparatus 100, the mobile measuring apparatus 200, the position and attitude localizing section 300, and the point cloud generating apparatus 400 include a CPU and a memory, and execute a function described as a "section".

Figure 4:
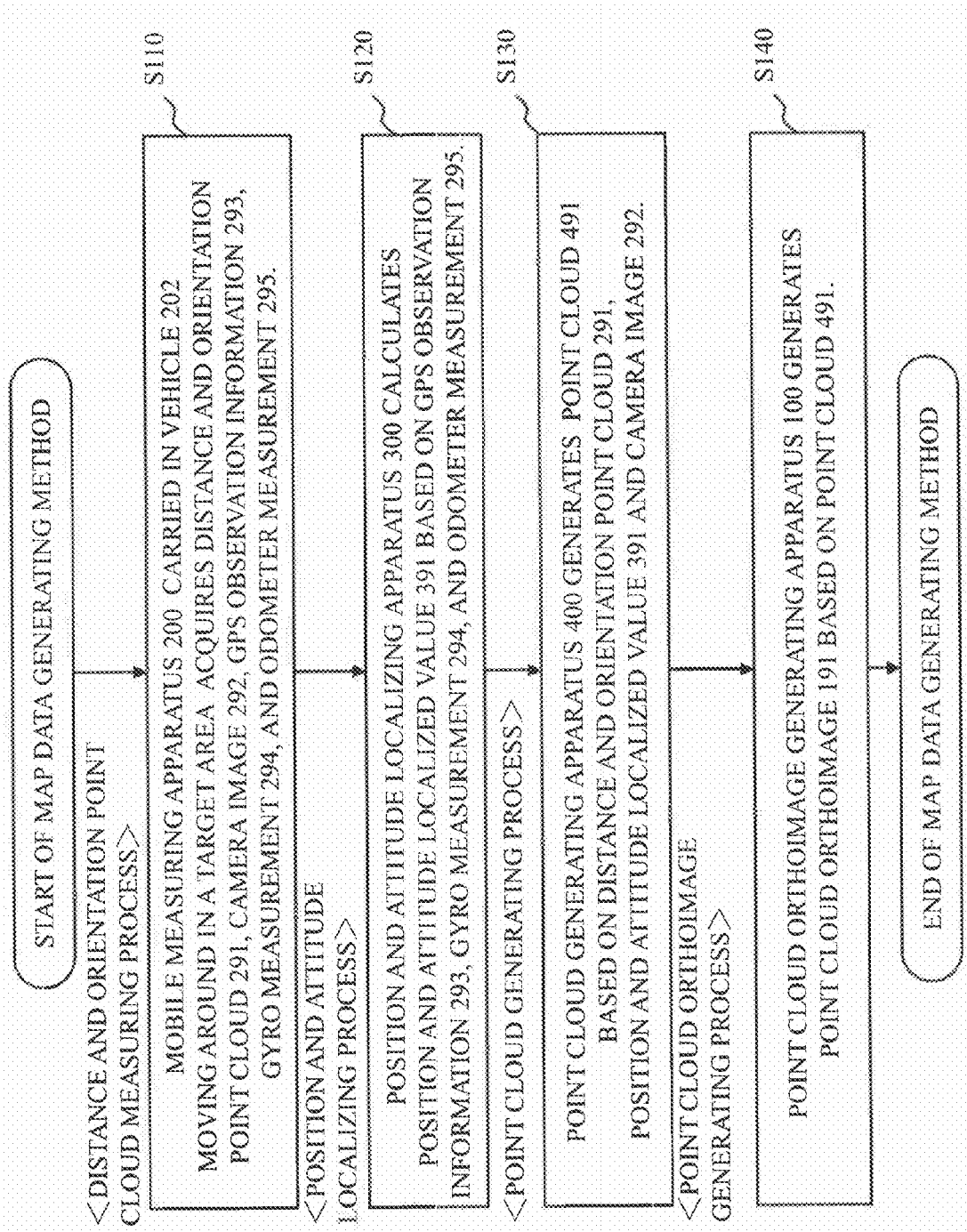
FIG. 4 shows a flow chart of a point cloud orthoimage generating method according to the first embodiment.

FIG. 4 shows a flow chart of a point cloud orthoimage generating method according to the first embodiment.

A point cloud orthoimage generating method of the orthoimage generating system 800 of the first embodiment will be described below with reference to FIG. 4.

The mobile measuring apparatus 200, the position and attitude localizing apparatus 300, the point cloud generating apparatus 400, the orthoimage generating apparatus 100 and the "sections" of those apparatuses execute the following processes by using the CPU.

<S110: Distance and Orientation Point Cloud Measuring Process>

First, the vehicle 202 carrying the mobile measuring apparatus 200 moves around in a target area.

While the vehicle 200 is moving around in a target area, the laser scanner 210, the camera 220, the GPS receiver 230, the gyro 240 and the odometer 250 installed in the mobile measuring apparatus 200 perform measurements and acquire the distance and orientation point cloud 291, the camera image 292, the GPS observation information 293, the gyro measurement value 294, and the odometer measurement value 295.

<S120: Position and Attitude Localizing Process>

Then, the position and attitude localizing section 310 of the position and attitude localizing apparatus 300 calculates the position and attitude localized value 391 based on the GPS observation information 293, the gyro measurement value 294, and the odometer measurement value 295 acquired in S110.

The position and attitude localized value 391 indicates the 3D coordinates and 3D attitude angle of the mobile measuring apparatus 200 at each time when the mobile measuring apparatus 200 moves in the target area.

<S130: Point Cloud Generating Process>

Then, the 3D point cloud generating section 410 of the point cloud generating apparatus 400 generates the 3D point cloud 419a based on the distance and orientation point cloud 291 acquired in S110 and the position and attitude localized value 391 calculated in S120. The point cloud generating section 420 of the point cloud generating apparatus 400 generates the point cloud 491 based on the 3D point cloud 419a and the camera image 292 acquired in S110.

The 3D point cloud 419a indicates the 3D coordinates of each point of the distance and orientation point cloud 291. Each point of the 3D point cloud 419a corresponds to a point of the distance and orientation point cloud 291.

The 3D point cloud generating section 410 extracts from the position and attitude localized value 391 the position and attitude of the mobile measuring apparatus 200 at the time of measurement of each point of the distance and orientation point cloud 291. The 3D point cloud generating section 410 then calculates as the 3D coordinates of each point the 3D coordinates of a point away from an extracted position and attitude by the distance and orientation of each point.

The point cloud 491 indicates the 3D coordinates and color of each point of the 3D point cloud 419a. Each point of the point cloud 491 corresponds to a point of the 3D point cloud 419a and a point of the distance and orientation point cloud 291.

The point cloud generating section 420 projects each point of the 3D point cloud 419a onto the camera image 292 based on the 3D coordinates of each point and treats the color of each point as the color of a pixel onto which each point of the 3D point cloud 419a is projected.

Alternatively, however, the point cloud 491 may not be colored by the point cloud generating section 420. The point cloud 491 may indicate black and white information (grayscale) corresponding to an observed brightness of reflected laser. For example, the point cloud generating section 420 may assign a whiter color to a point of the point cloud 491 having a higher brightness of reflected laser, and a darker color to a point having a lower brightness of reflected laser.

<S140: Point Cloud Orthoimage Generating Process>

The point cloud projecting section 110 of the orthoimage generating apparatus 100 generates the point cloud orthoimage 191 based on the point cloud 491 generated in S130.

The point cloud orthoimage 191 shows an image of a target area viewed vertically downward from the sky.

The point cloud projecting section 110 treats as the point cloud orthoimage 191 of the target area an image obtained by orthographically projecting each point of the point cloud 491 onto a horizontal plane corresponding to the latitude and longitude of the target area.

The plane, onto which each point of the point cloud 491 is orthographically projected, however, may not be limited to the horizontal plane. The plane may alternatively be inclined to the horizontal plane.

Still alternatively, the type of projection used for projecting the point cloud 491 by the point cloud projecting section 110 may not be limited to orthographical projection. Central projection may be used instead, for example.

Examples of the point cloud orthoimage 191 generated by the point cloud orthoimage generating method (S110 to S140) will be described below.

Figure 5:
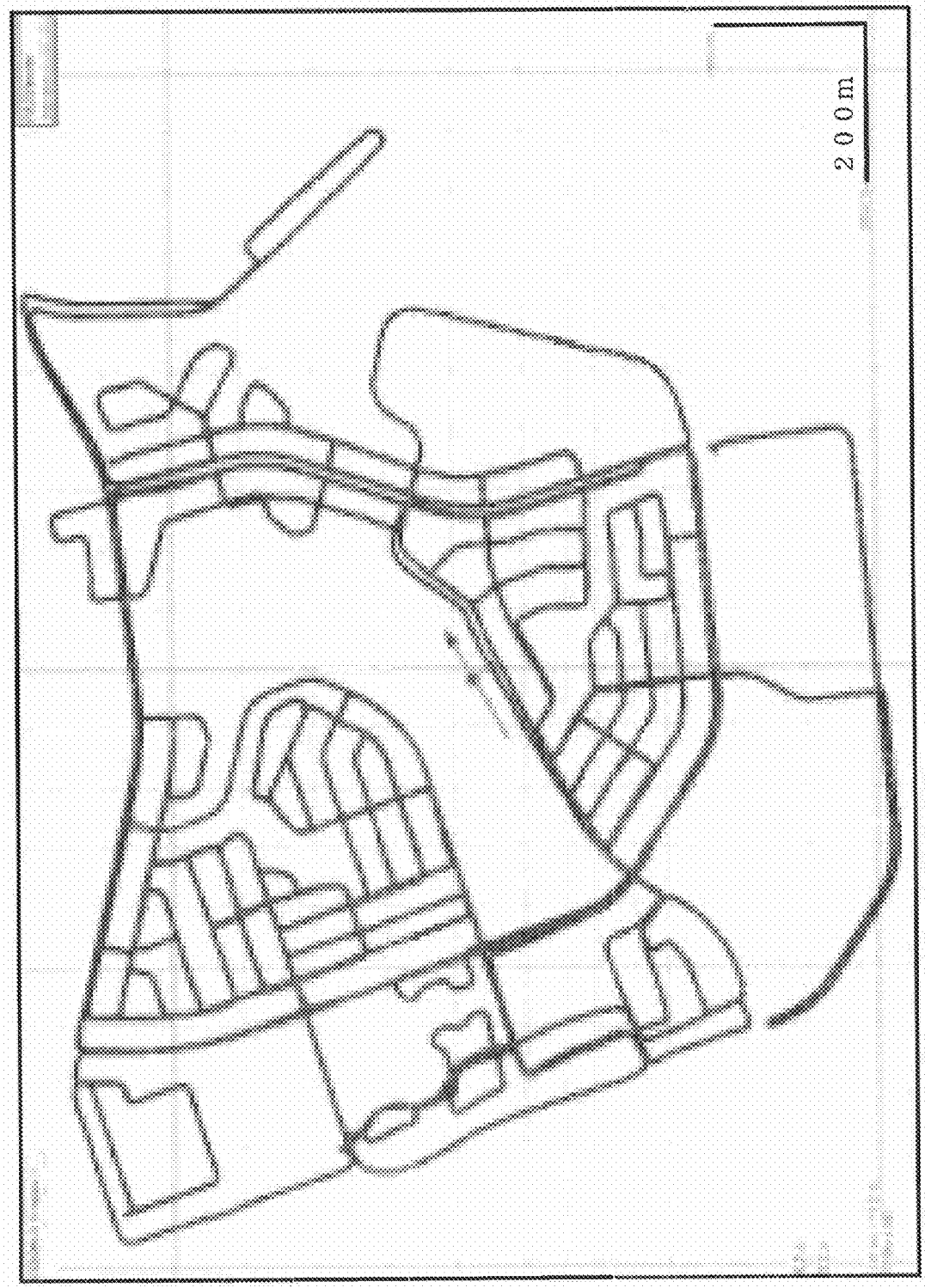
FIG. 5 shows a road map illustrating an area (a target area) in which the mobile measuring apparatus 200 has moved.

FIG. 5 shows a road map of an area (a target area) in which the mobile measuring apparatus 200 has moved around.

It is assumed, for example, the mobile measuring apparatus 200 perform measurements while moving around in the area shown in FIG. 5, and acquires the distance and orientation point cloud 291, the camera image 292, the GPS observation information 293, the gyro measurement value 294, and the odometer measurement value 295, in the distance and orientation point cloud measuring process (S110).

Figure 6:
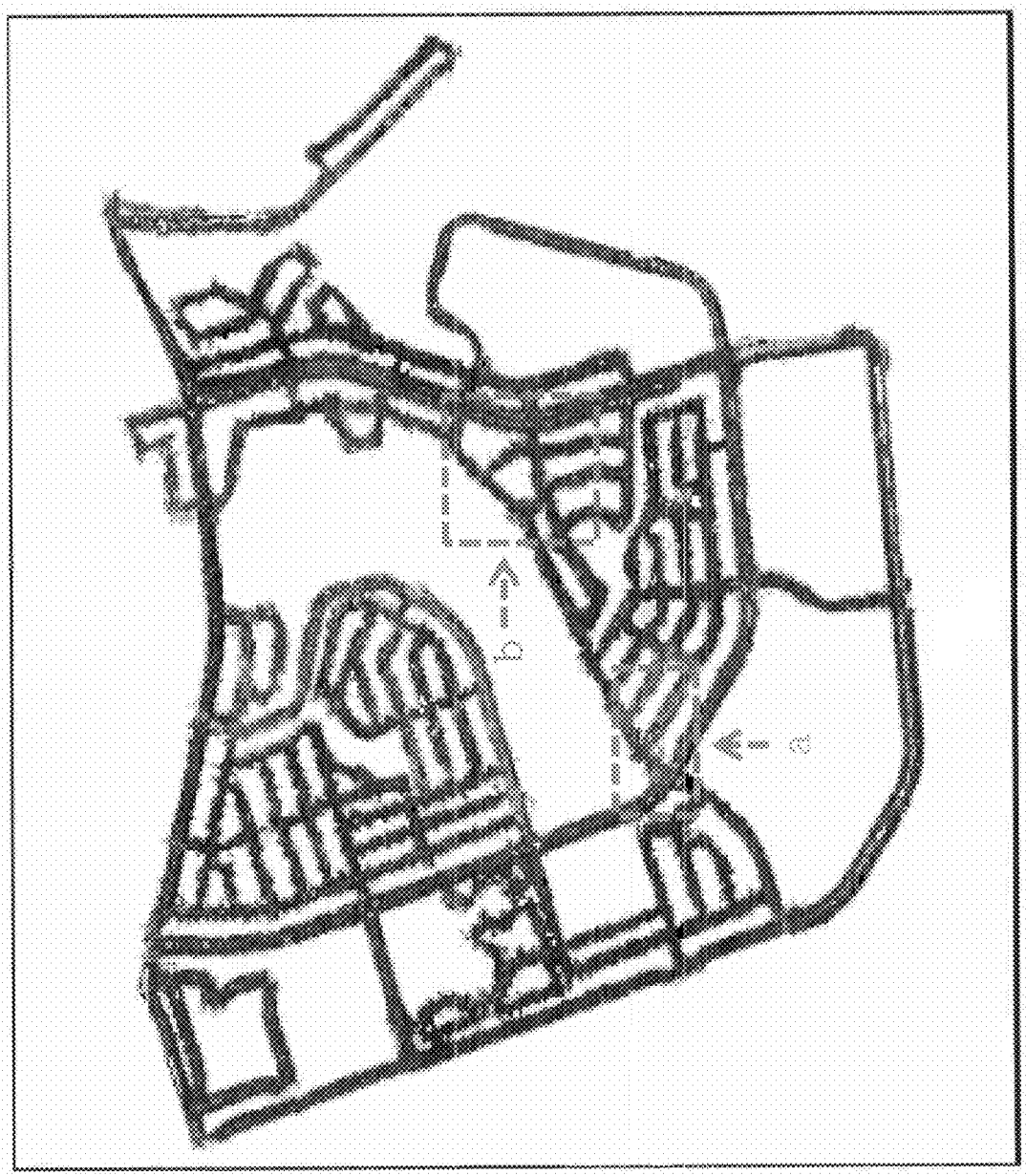
FIG. 6 shows a point cloud orthoimage 191 of the target area (FIG. 5)

FIG. 6 shows the point cloud orthoimage 191 of the target area (FIG. 5).

The point cloud projecting section 110 orthographically projects the point cloud 491, thereby obtaining the point cloud orthoimage 191 shown in FIG. 6, in the point cloud orthoimage generating process (S140).

As shown in FIG. 6, the point cloud orthoimage 191 matches the road map shown in FIG. 5. The point cloud orthoimage 191 may show the road of the target area with high accuracy corresponding to the measuring accuracy of the mobile measuring apparatus 200 and the localizing accuracy of the position and attitude localizing apparatus 300.

Figure 7:
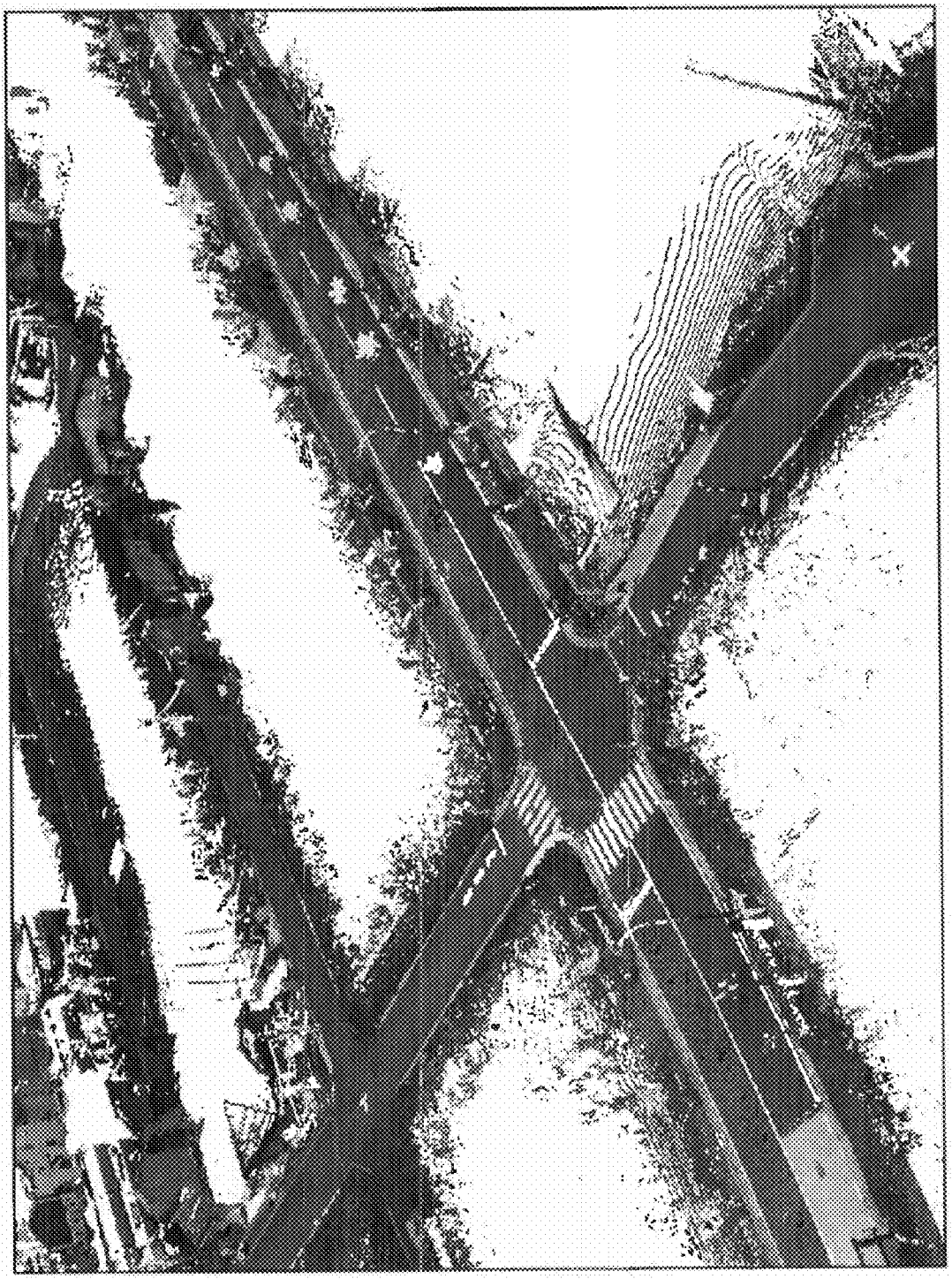
FIG. 7 shows an example of an aerial image of a point cloud 491.
Figure 8:
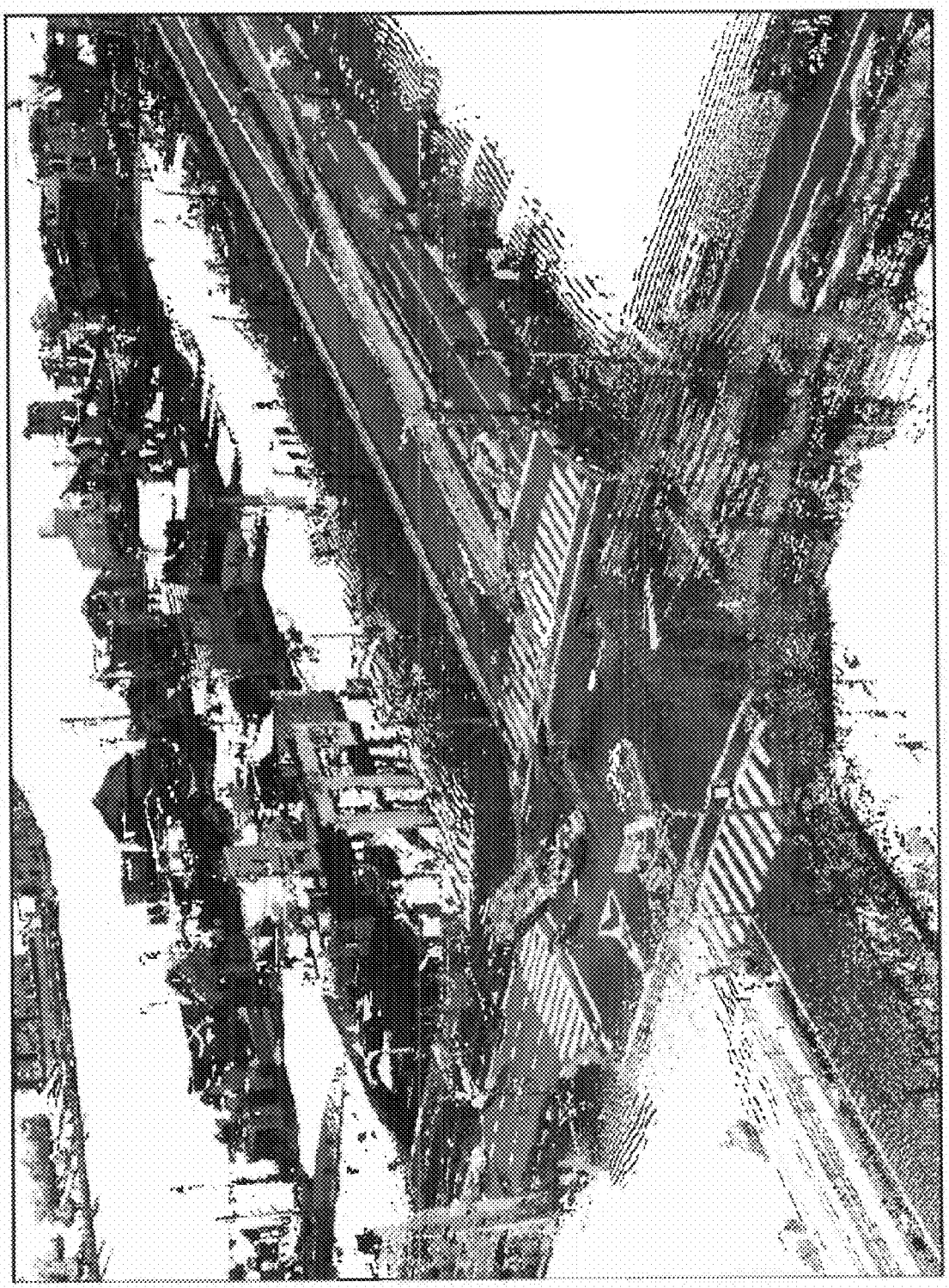
FIG. 8 shows an example of an aerial image of the point cloud 491.

FIG. 7 and FIG. 8 show examples of aerial images of different intersections in close-up indicated by the point cloud 491.

In the point cloud orthoimage generating process (S140), when the point cloud 491 is projected onto a plane inclined to a horizontal plane (or when the point cloud orthoimage 191 is rotated about a horizontal axis by image processing), an aerial image such as those shown in FIG. 7 and FIG. 8 may be generated.

As shown in FIG. 7 and FIG. 8, various kinds of features, such as an intersection, a house, a parked vehicle, and a pedestrian crossing, may be shown by an aerial image generated by projecting the point cloud 491. Each of the features shown in the aerial image is displayed with a high degree of accuracy in position and size corresponding to the measuring accuracy of the mobile measuring apparatus 200 and the localizing accuracy of the position and attitude localizing apparatus 300.

The orthoimage generating apparatus 100 may thus generate, with a high degree of accuracy by projecting the point cloud 491 onto a plane, the image (the point cloud orthoimage 191, an aerial image, etc.) of a target area viewed from an angle (vertically downwards, obliquely downwards, etc.) not actually used by the camera when the photograph was taken.

The orthoimage generating apparatus 100 of the first embodiment may also be described as follows.

The orthoimage generating apparatus 100 detects with a high degree of accuracy features such as a sign, a white line, a road surface mark, a manhole, a curb, a power pole, a pole, a streetlight, an electric wire, and a wall by using a laser point cloud (the distance and orientation point cloud 291) acquired by the mobile measuring apparatus 200.

The point cloud 491 includes 3D position information (3D coordinates) for each point. Accordingly, the orthoimage generating apparatus 100 is allowed to generate an image viewed from an arbitrary direction by arranging the point clouds 491 in series. Therefore, the orthoimage generating apparatus 100 may generate the point cloud orthoimage 191 equivalent to the orthoimage of an aerial photo when the point clouds 491 arranged in series are viewed from directly above. The point cloud orthoimage 191 is less distorted compared to an orthoimage generated by using a camera image taken from a vehicle, with a high degree of accuracy and a wide viewing angle.

The point cloud orthoimage 191 shows features, such as a while line, a curb, and a wall surface, clearly. The point cloud orthoimage 191 may therefore be used for generating a road map. For example, the point cloud orthoimage 191 may be pasted as a background on a CAD (Computer Aided Design) image. If each feature appearing on the point cloud orthoimage 191 is traced with lines, a current road map may be generated at high speed. It is also possible to extract each feature from the point cloud orthoimage 191 by image processing and generate a road map automatically.

Patent Document 1 (JP 2007-218705 A) discloses a method for calculating the position and attitude of a measurement carriage (S101 of Patent Document 1) based on various kinds of measurement data acquired by the measurement carriage to generate a road surface shape model (a 3D point cloud) (S106 of Patent Document 1). Patent Document 1 also discloses a method for projecting a road surface shape model (a 3D point cloud) onto a camera image (S107 of Patent Document 1).

The mobile measuring apparatus 200 corresponds to the measurement carriage of Patent Document 1. The position and attitude localizing apparatus 300 corresponds to the vehicle position and attitude (triaxial) calculating section of Patent Document 1. The point cloud generating apparatus 400 corresponds to the road surface shape model generating section of Patent Document 1.

Embodiment 2

A description will now be given of a second embodiment in which the point cloud orthoimage 191 allows the whole road to be visible without being covered by trees, tunnels, and the like.

Hereinafter, a description will be given primarily of elements that are different from those discussed in the first embodiment, and therefore elements that will not be elaborated below are assumed to be the same as those discussed in the first embodiment.

Figure 9:
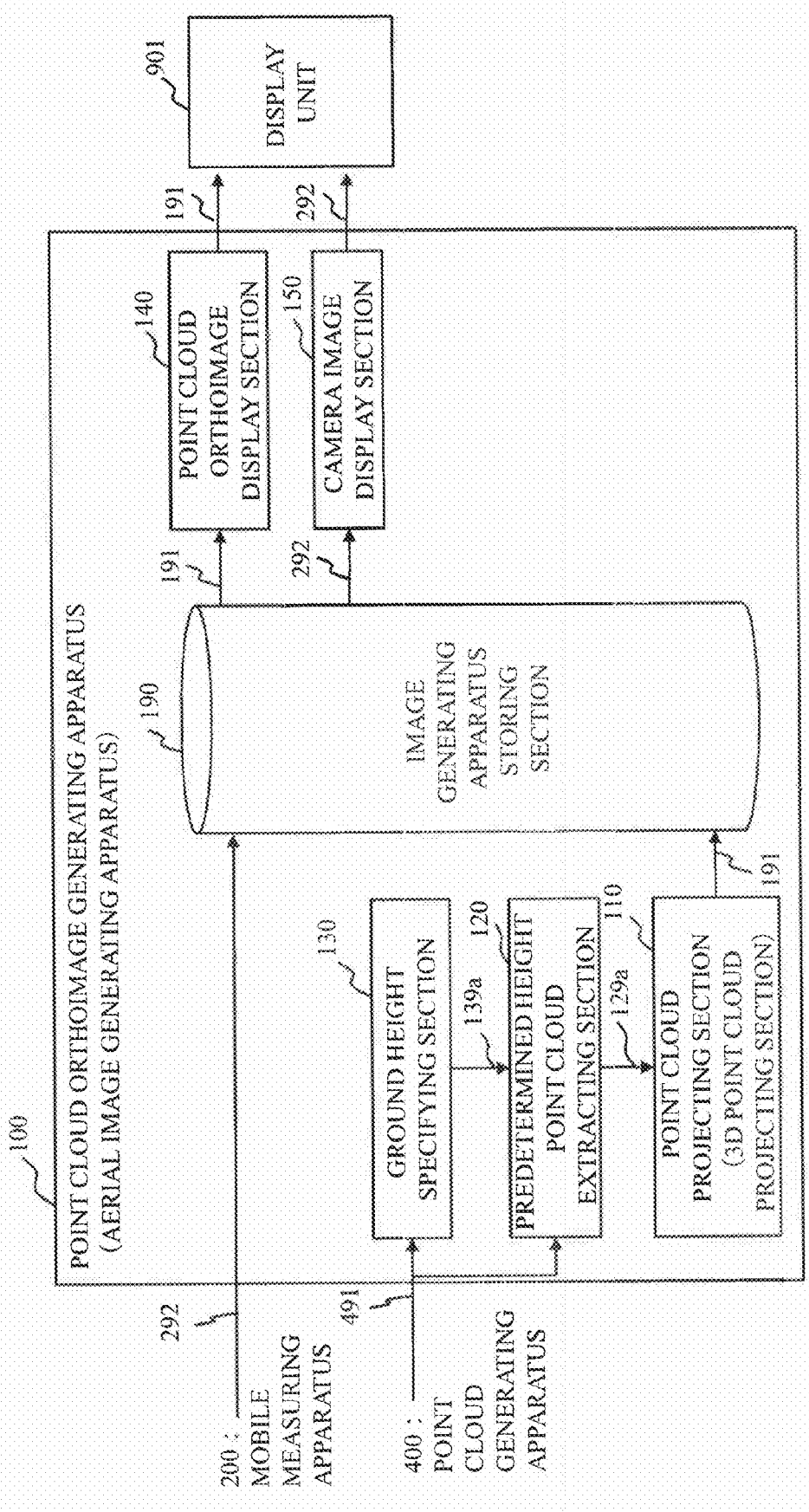
FIG. 9 shows a configuration of the point cloud orthoimage generating apparatus 100 according to a second embodiment.

FIG. 9 shows a configuration of the orthoimage generating apparatus 100 according to the second embodiment.

The configuration of the orthoimage generating apparatus 100 of the second embodiment will be described below with reference to FIG. 9.

The orthoimage generating apparatus 100 (an example of an aerial image generating apparatus) includes the point cloud projecting section 110, a predetermined height point cloud extracting section 120, a ground height specifying section 130, a point cloud orthoimage display section 140, a camera image display section 150, and the storing section 190.

The ground height specifying section 130 specifies a ground height 139a by using CPU based on height (altitude) indicated by 3D coordinates of each point of the point cloud 491 (an example of a 3D point cloud) generated by the point cloud generating apparatus 400.

The predetermined height point cloud extracting section 120 extracts every point whose height is within a predetermined range from the point cloud 491 based on the 3D coordinates of each point of the point cloud 491 (an example of a 3D point cloud) generated by the point cloud generating apparatus 400.

More specifically, the point cloud extracting section 120 extracts every point whose height from the ground is the same or lower than a predetermined height based on the ground height 139a specified by the ground height specifying section 130.

Hereinafter, each point extracted from the point cloud 491 by the point cloud extracting section 120 will be referred to as a predetermined height point cloud 129a.

The point cloud projecting section 110 (an example of a 3D point cloud projecting section) generates the point cloud orthoimage 191 (an example of an aerial image) by projecting each point of the predetermined height point cloud 129a onto a plane by using CPU based on the 3D coordinates of each point of the predetermined height point cloud 129a extracted from the point cloud 491 by the point cloud extracting section 120.

The point cloud orthoimage display section 140 (an example of an aerial image display section) displays the point cloud orthoimage 191 generated by the point cloud generating section 110 on the display unit 901.

The camera image display section 150 specifies a point projected onto a designated portion of the point cloud orthoimage 191 displayed by the orthoimage display section 140, by using CPU, and displays on the display unit 901 a camera image 292 taken at a site of measurement where the specified point has been measured.

The storing section 190 stores the camera image 292 acquired by the mobile measuring apparatus 200 and the point cloud orthoimage 191 generated by the point cloud projecting section 110.

Figure 10:
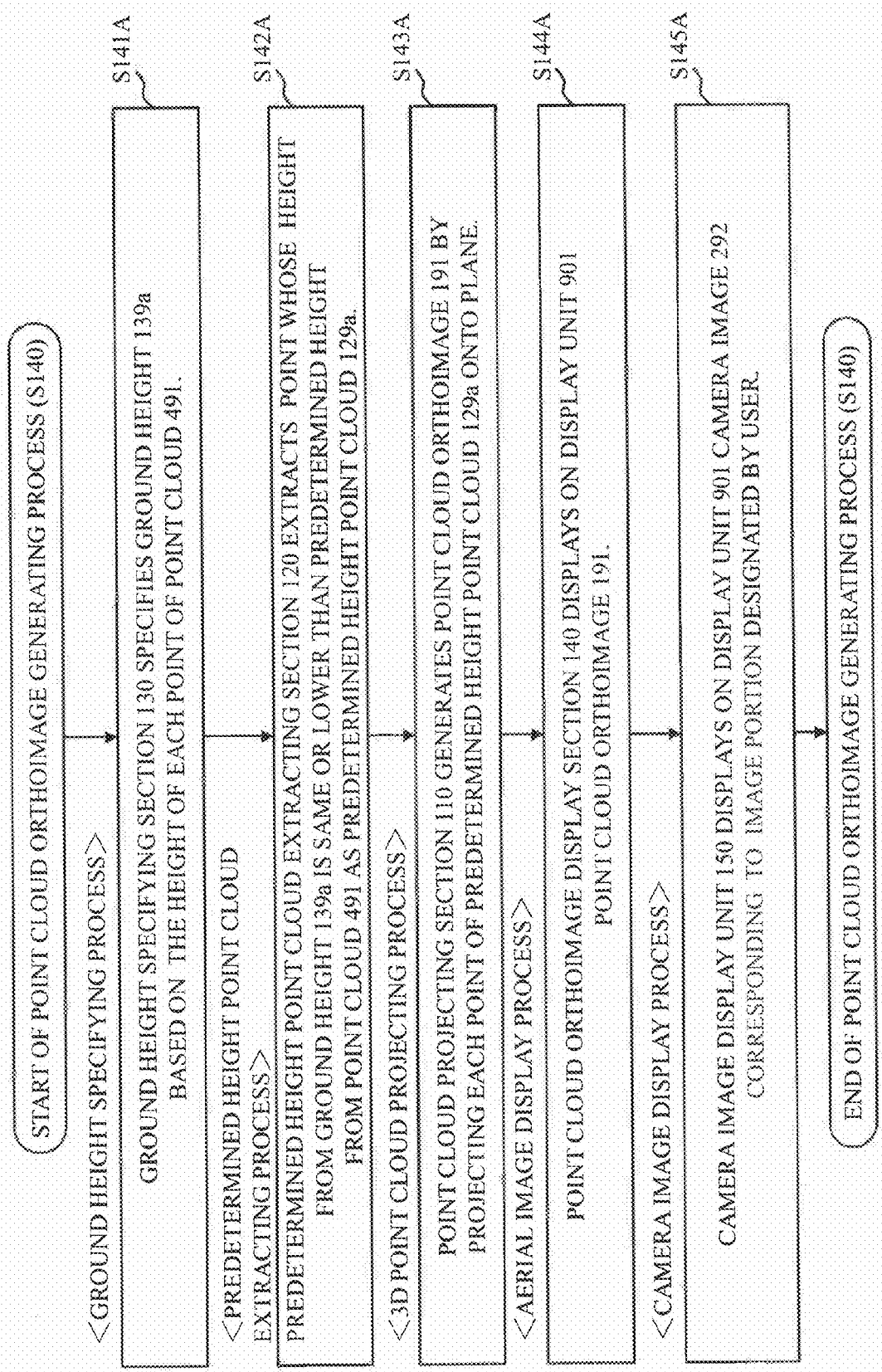
FIG. 10 shows a flow chart of a point cloud orthoimage generating process (S140) according to the second embodiment.

FIG. 10 shows a flow chart of the point cloud orthoimage generating process (S140) according to the second embodiment.

The flow of the point cloud orthoimage generating process (S140) of the second embodiment will be described below with reference to FIG. 10.

The "sections" of the orthoimage generating apparatus 100 execute processes described below by using CPU.

<S141A: Ground Height Specifying Process>

First, the ground height specifying section 130 specifies the ground height 139a based on the height of the 3D coordinates of each point of the point cloud 491.

When specifying the ground height 139a of a specific zone, for example, the ground height specifying section 130 extracts a point having the lowest height of all the points indicating the latitude and the longitude in the specific zone, and treats the height of the extracted point as the ground height 139a of that specific zone.

A method for specifying the ground height 139a will be elaborated in a fourth embodiment.

<S142A: Predetermined Height Point Cloud Extracting Process>

Then, the point cloud extracting section 120 treats as a reference height the ground height 139a specified in S141A, and extracts as the predetermined height point cloud 129a every point whose height from the ground height 139a is the same or lower than a predetermined height from the point cloud 491.

Specifically, the predetermined height point cloud 129a is obtained by removing every point whose height from the ground height 139a is higher than the predetermined height from the point cloud 491.

For example, if the predetermined height is "50 cm", then the point cloud extracting section 120 extracts as the predetermined height point cloud 129a every point at which the height indicated by the 3D coordinates is the same or lower than "(the ground height 139a)+50 [cm]" from the point cloud 491. If the ground height 139a is specified for each zone, the point cloud extracting section 120 extracts the predetermined height point cloud 129a for each zone.

<S143A: 3D Point Cloud Projecting Process>

Then, the point cloud projecting section 110 generates the point cloud orthoimage 191 by orthographically projecting each point of the predetermined height point cloud 129a extracted in S142A onto a horizontal plane.

However, the plane onto which each point of the predetermined height point cloud 129a is orthographically projected is not limited to the horizontal plane, and the type of projection by the point cloud projecting section 110 is not limited to the orthographical projection, either.

<S144A: Aerial Image Display Process>

Then, the orthoimage display section 140 displays on the display unit 901 the point cloud orthoimage 191 generated in S143A.

Then, it is assumed that a user designates an image portion of the point cloud orthoimage 191 displayed on the display unit 901 by using the mouse 903, the keyboard 902, or the like, in order to confirm the camera image 292 of that image portion.

<S145A: Camera Image Display Process>

The camera image display section 150 displays on the display unit 901 the camera image 292 corresponding to the image portion designated by the user.

Specifically, the camera image display section 150 specifies a point of the point cloud 491 projected onto the image portion designated by the user, specifies the camera image 292 taken at the site of measurement of the specified point (hereinafter referred to as a specified point), and displays the specified camera image 292 on the display unit 901.

The specified camera image 292 is the camera image 292 taken at the time when the specified point was measured. The time when the specified point was measured is the time when the point of the distance and orientation point cloud 291 as the original data of the specified point was measured.

This allows the user to recognize by the camera image 292 displayed on the display unit 901 a feature that is difficult to be identified in the point cloud orthoimage 191.

Examples of the point cloud orthoimage 191 generated by the point cloud orthoimage generating processes (S141A to S143A) will be described below.

Figure 11:
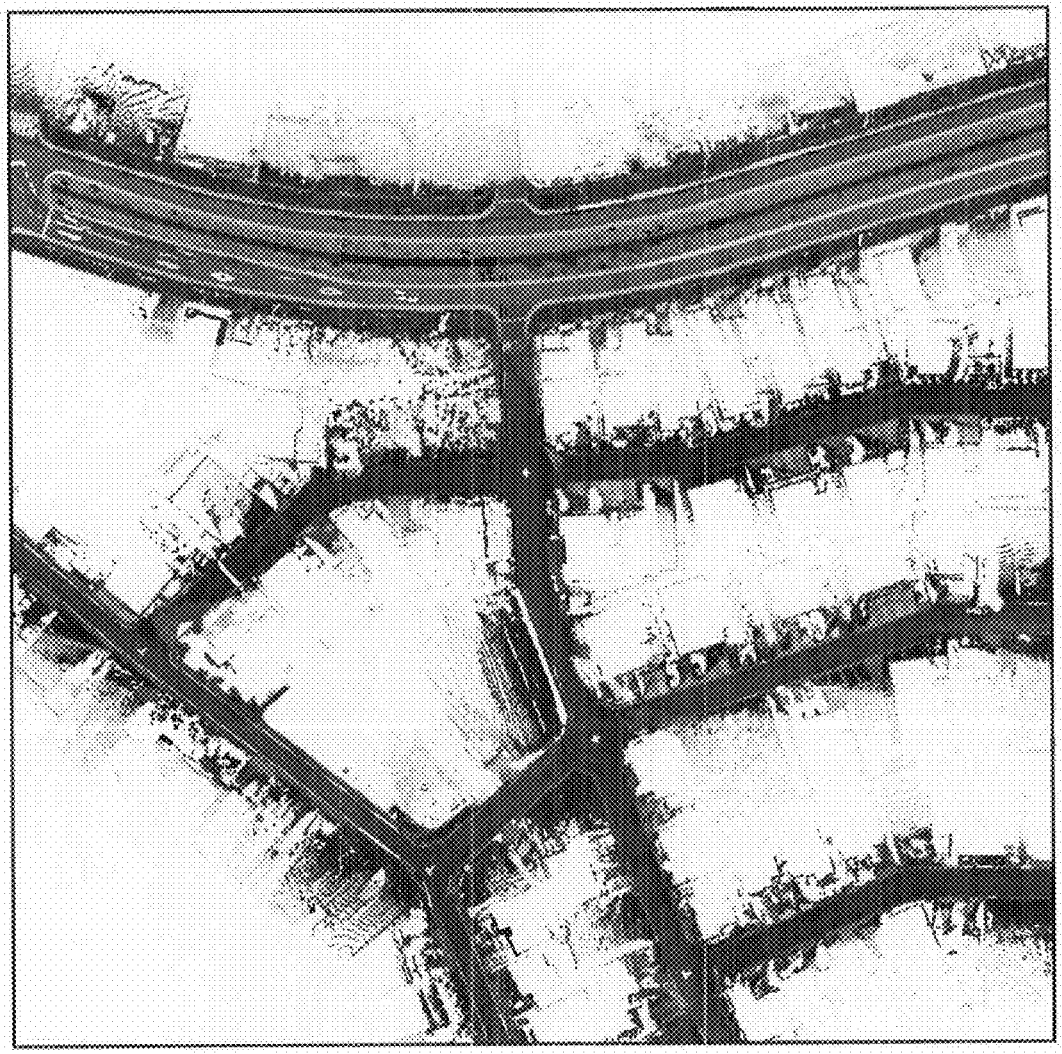
FIG. 11 shows the point cloud orthoimage 191 of a target area b (FIG. 6) onto which a predetermined height point cloud 129a whose height from a ground height 139a is the same or lower than 50 cm is orthographically projected.
Figure 12:
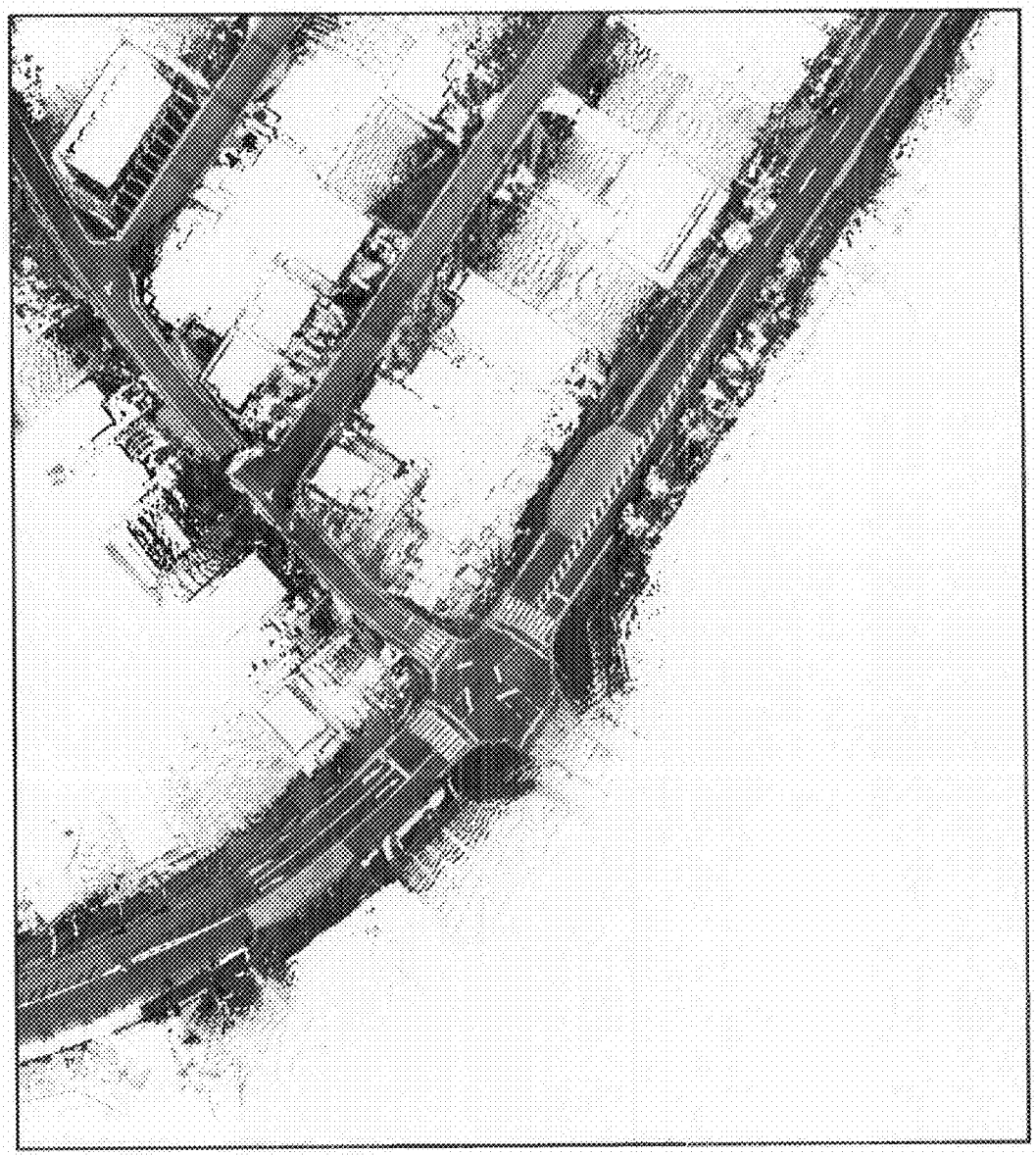
FIG. 12 shows the point cloud orthoimage 191 of the target area a (FIG. 6) onto which the predetermined height point cloud 129a whose height from the ground height 139a is the same or lower than 50 cm is orthographically projected.

FIG. 11 shows the point cloud orthoimage 191 of a target area b (FIG. 6). FIG. 12 shows the point cloud orthoimage 191 of a target area a (FIG. 6). Both the point cloud orthoimages 191 of FIG. 11 and FIG. 12 are obtained by orthographically projecting the predetermined height point cloud 129a whose height from the ground height 139a is the same or lower than 50 cm, exclusively.

In the predetermined height point cloud extracting process (S142A), every point whose height from the ground height 139a is higher than 50 cm is removed from the point cloud 491, and every point whose height from the ground height 139a is the same or lower than 50 cm is exclusively extracted as the predetermined height point cloud 129a.

As a result, roads shown in FIG. 11 and FIG. 12 are not hidden or covered by features hiding or covering the roads or covering features, such as trees and tunnels, and thus white lines, road boundaries and the like are clearly visible.

The orthoimage generating apparatus 100 of the second embodiment may also be described as follows.

Aerial photos used as road images have failed to show portions of a road hidden or covered beneath a tree, inside a tunnel, and the like when viewed from directly above.

However, the orthoimage generating apparatus 100, on the other hand, is configured to generate the point cloud orthoimage 191 with the limited use of the point cloud 491 so that the point cloud whose height from the road surface (the ground height 139a) is the same or lower than the predetermined height (the predetermined height point cloud 129a) is exclusively used. This results in removing features such as trees and tunnels covering or hiding a road, and thereby showing the whole surface of a road.

Furthermore, the vehicle 202 carrying the mobile measuring apparatus 200 moves with a predetermined distance (e.g., 5 m approximately) from other vehicles. This may contribute to acquire the distance and orientation point cloud 291 without containing measurement values of other vehicles. As a result, the orthoimage generating apparatus 100 may generate the point cloud orthoimage 191 showing no moving vehicles by using the point cloud 491 generated based on the distance and orientation point cloud 291 including no measurement values of other vehicles.

Thus, the orthoimage generating apparatus 100 is capable of generating clear road images including no obscure portions.

The orthoimage generating apparatus 100 may also show the camera image 292 in conjunction with the point cloud orthoimage 191 if a user has difficulty in identifying the type of a feature or the writing on a feature (e.g., a power pole, a streetlight, or a sign) in the point cloud orthoimage 191. For example, the orthoimage generating apparatus 100 may display the point cloud orthoimage 191 and the camera image 292 on a CAD screen by liking them together. Specifically, the orthoimage generating apparatus 100 may retrieve the camera image 292 taken around the time when a point was measured. This may allow a user to identify whether a feature shown in the point cloud orthoimage 191 is a power pole, a streetlight, or a sign. Alternatively, the orthoimage generating apparatus 100 may be configured to extract the content (e.g., the text or graphics on a sign, etc.) of a sign or the like by processing the camera image 292, and then display the extracted information in conjunction with the camera image 292. This may allow a user not only to discriminate between a power pole and a streetlight, but also to confirm the content or writing on a sign or the like.

Embodiment 3

A description will now be given of a third embodiment in which the point cloud orthoimage 191 allows a feature in a standing condition to be specified.

Hereinafter, a description will be given primarily of elements that are different from those discussed in the first and second embodiments, and therefore elements that will not be elaborated below are assumed to be the same as those discussed in the first and second embodiments.

Figure 13:
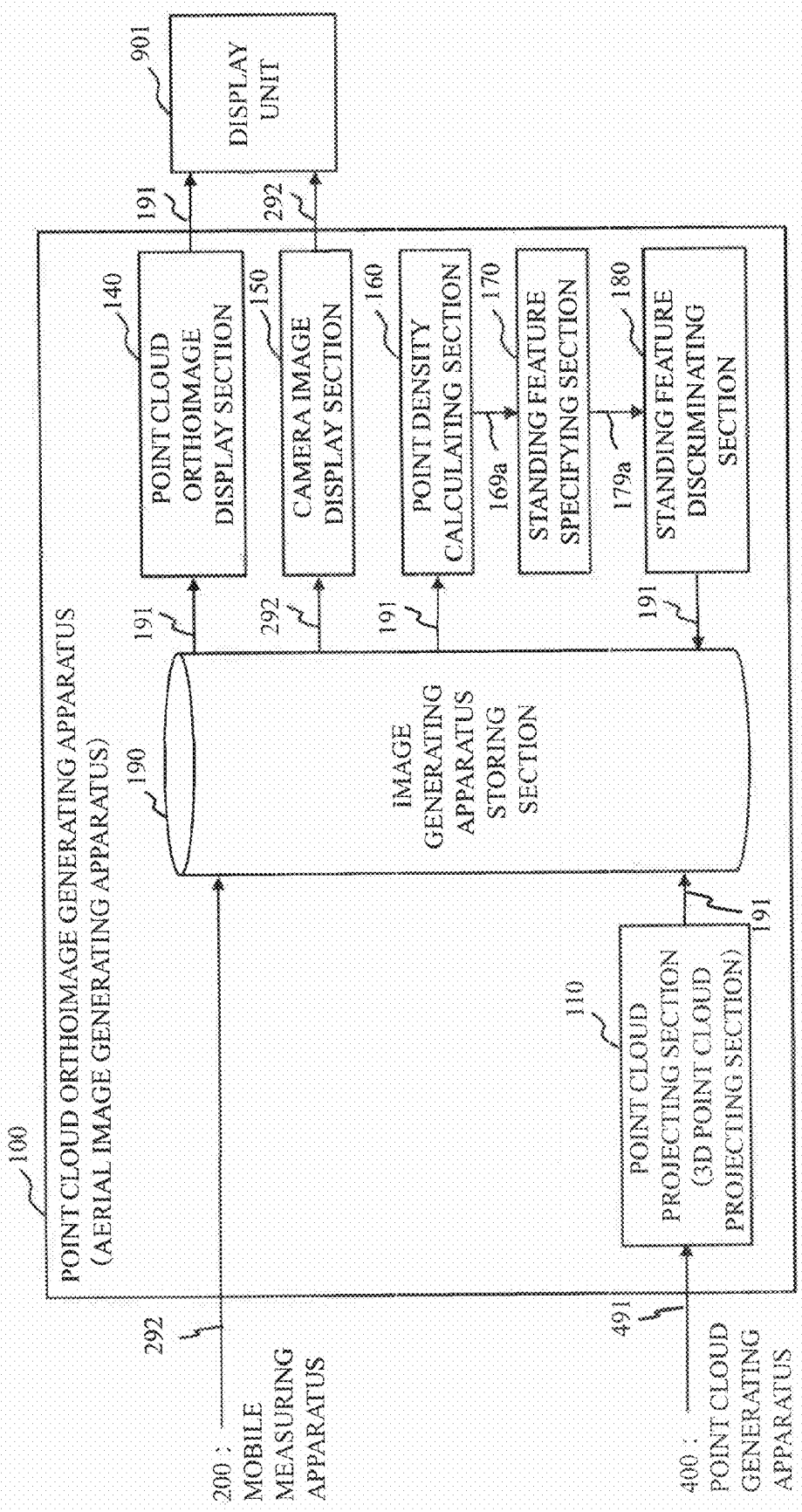
FIG. 13 shows a configuration of the point cloud orthoimage generating apparatus 100 according to a third embodiment.

FIG. 13 shows a configuration of the orthoimage generating apparatus 100 according to the third embodiment.

The configuration of the orthoimage generating apparatus 100 of the third embodiment will be described below with reference to FIG. 3.

The point cloud orthoimage generating apparatus 100 (an example of the aerial image generating apparatus) includes the point cloud projecting section 110, the orthoimage display section 140, the camera image display section 150, a point density calculating section 160, a standing feature specifying section 170, a standing feature discriminating section 180, and the storing section 190.

The point density calculating section 160 calculates by using CPU a point density 169a of the point cloud orthoimage 191 generated by the point cloud projecting section 110 for each zone of the point cloud orthoimage 191 divided into zones of a predetermined size.

The standing feature specifying section 170 specifies a portion of the point cloud orthoimage 191 showing a feature in a standing condition or a standing feature, by using CPU, based on the point density 169a calculated by the point density calculating section 160.

Hereinafter, an image portion specified by the standing feature specifying section 170 will be referred to as a standing feature image portion 179a.

The standing feature discriminating section 180 generates, by using CPU, the point cloud orthoimage 191 in which the standing feature image portion 179a specified by the standing feature specifying section 170 is discriminated from other image portions.

Figure 14:
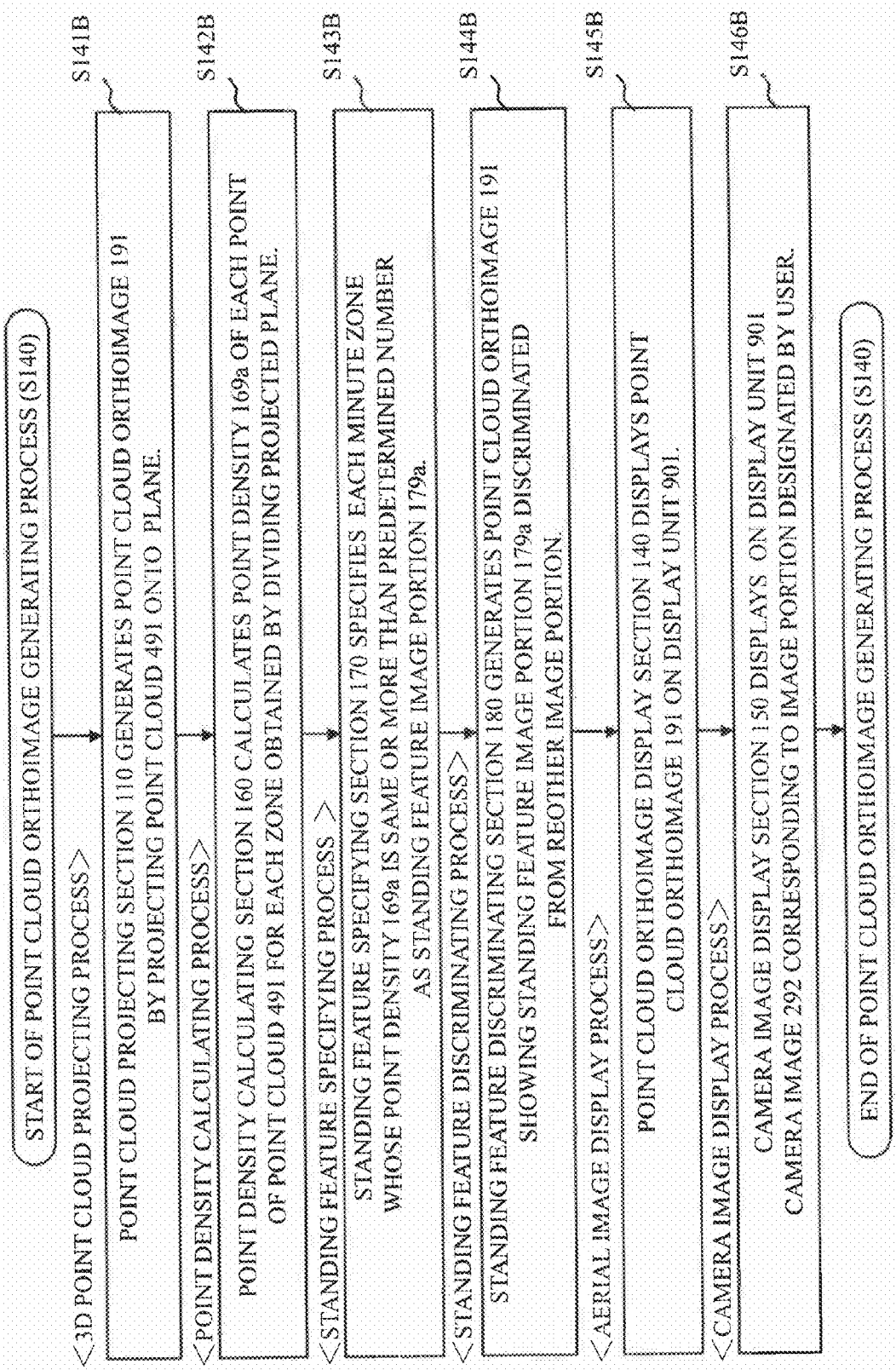
FIG. 14 shows a flow chart of the point cloud orthoimage generating process (S140) according to the third embodiment.

FIG. 14 shows a flow chart of the point cloud orthoimage generating process (S140) according to the third embodiment.

The flow of the point cloud orthoimage generating process (S140) of the third embodiment will be described below with reference to FIG. 14.

The "sections" of the orthoimage generating apparatus 100 execute processes explained below by using CPU.

<S141B: 3D Point Cloud Projecting Process>

The point cloud projecting section 110 generates the point cloud orthoimage 191 by projecting the point cloud 491 onto a horizontal plane.

Hereinafter, a horizontal plane onto which the point cloud 491 is orthographically projected will be referred to as a "projected plane".

<S142B: Point Density Calculating Process>

The point density calculating section 160 divides the projected plane into zones of a predetermined size, and calculates the point density 169a of each point of the point cloud 491 for each zone.

Each zone is minute in size. The size is approximately "30 cm×30 cm" of the real world and not the size within an image, for example. One pixel of the point cloud orthoimage 191 may correspond to one zone, for example.

The "point density 169a" is assumed to be the number of points of the point cloud 491 projected onto the minute zone.

<S143B: Standing Feature Specifying Process>

The standing feature specifying section 170 specifies as the standing feature image portion 179a each minute zone whose point density 169a calculated in S142B is the same or more than a predetermined number.

The laser scanner 210 performs measurements in the height direction on the sides of the vehicle 202, and therefore a feature having height (hereinafter, referred to as the standing feature), such as a wall surface, a power pole, or a streetlight, is measured at a plurality of points in the height direction. A feature having no height, on the other hand, such as a road surface is measured at one point in the height direction. Therefore, the point density 169a of a standing feature is higher than the point density 169a of a road surface. Given this fact, the standing feature image portion 179a specifies as the standing feature image portion 179a a minute zone whose point density 169a is the same or higher than a predetermined number.

For example, the standing feature specifying section 170 may specify as the standing feature image portion 179a a minute zone onto which ten or more points are projected.

<S144B: Standing Feature Discriminating Process>

The standing feature discriminating section 180 generates the point cloud orthoimage 191 in which the standing feature image portion 179a specified in S143B is discriminated from other image portions.

For example, the standing feature discriminating section 180 may assign a predetermined color to the standing feature image portion 179a.

Alternatively, the standing feature discriminating section 180 may assign different colors between the standing feature image portion 179a and other image portions (e.g., "red" for the standing feature image portion 179a and "black" for other image portions), for example.

Still alternatively, the standing feature discriminating section 180 may add a specific mark to the standing feature image portion 179a, for example.

Still alternatively, the standing feature discriminating section 180 may divide the standing feature image portion 179a by point density, and then add different colors or marks to the standing feature image portion 179a for each point density. The standing feature discriminating section 180 may assign colors, "white", and "green" to "red" in order from high to low of the point density, for example.

<S145B: Aerial Image Display Process>

The orthoimage display section 140 displays the point cloud orthoimage 191 generated in S144B on the display unit 901.

<S146B: Camera Image Display Process>

The camera image display section 150 displays the camera image 292 corresponding to an image portion designated by a user on the display unit 901 in the same manner as that of S145A (FIG. 10).

The orthoimage generating apparatus 100 may specify a standing feature in the point cloud orthoimage 191 by calculating the point density of a minute zone. This allows a user to know the position of a standing feature such as a power pole.

The orthoimage generating apparatus 100 may be provided with the ground height specifying section 130 and the point cloud extracting section 120, like the second embodiment.

The point cloud extracting section 120 extracts as the reference height the ground height 139a specified by the ground height specifying section 130, and extracts as the predetermined height point cloud 129a every point whose height from the ground height 139a is the same or higher than a predetermined height from the point cloud 491. In other words, the predetermined height point cloud 129a is obtained by removing every point whose height from the ground height 139a is lower than the predetermined height from the point cloud 491.

The point cloud projecting section 110 generates the point cloud orthoimage 191 based on the predetermined height point cloud 129a extracted by the point cloud extracting section 120.

Contrary to the second embodiment, the point cloud projecting section 110 may generate the point cloud orthoimage 191 that shows no road surface by the point cloud extracting section 120 removing every point whose height from the ground height 139a is lower than "50 cm", for example.

This allows the orthoimage generating apparatus 100 to specify a standing feature accurately and allows a user to identify the standing feature without difficulty.

The following are examples of the point cloud orthoimage 191 onto which the predetermined height point cloud 129a whose height from the ground height 139a is 50 cm or higher is orthographically projected.

Figure 15:
FIG. 15 shows the point cloud orthoimage 191 of the target area b (FIG. 6) onto which the predetermined height point cloud 129a whose height from the ground height 139a is the same or higher than 50 cm is orthographically projected.
Figure 16:
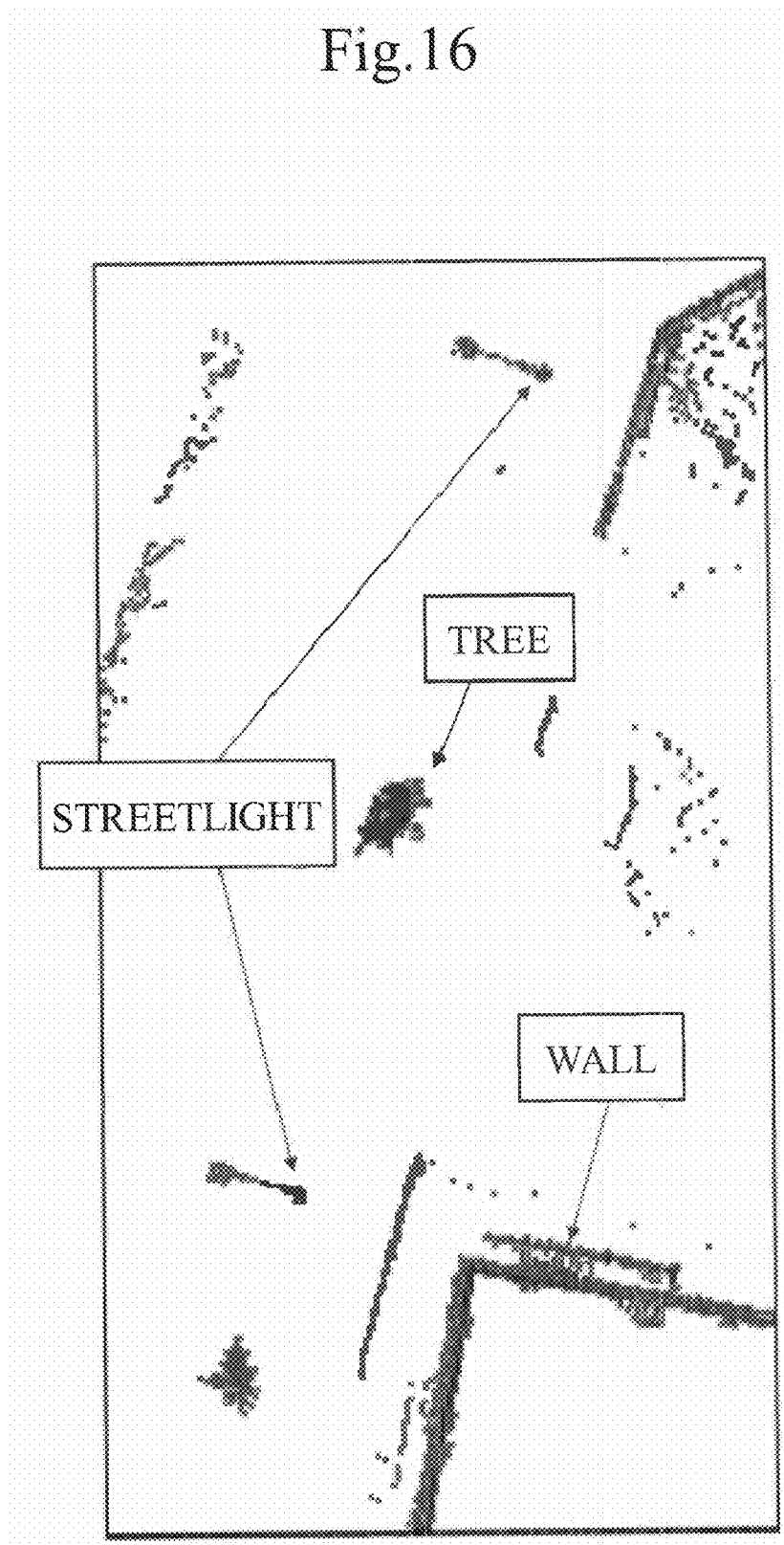
FIG. 16 shows an enlarged view of a part of the target area b.

FIG. 15 shows the point cloud orthoimage 191 of the target area b (FIG. 6), and FIG. 16 shows a part of the target area b in close-up.

Figure 17:
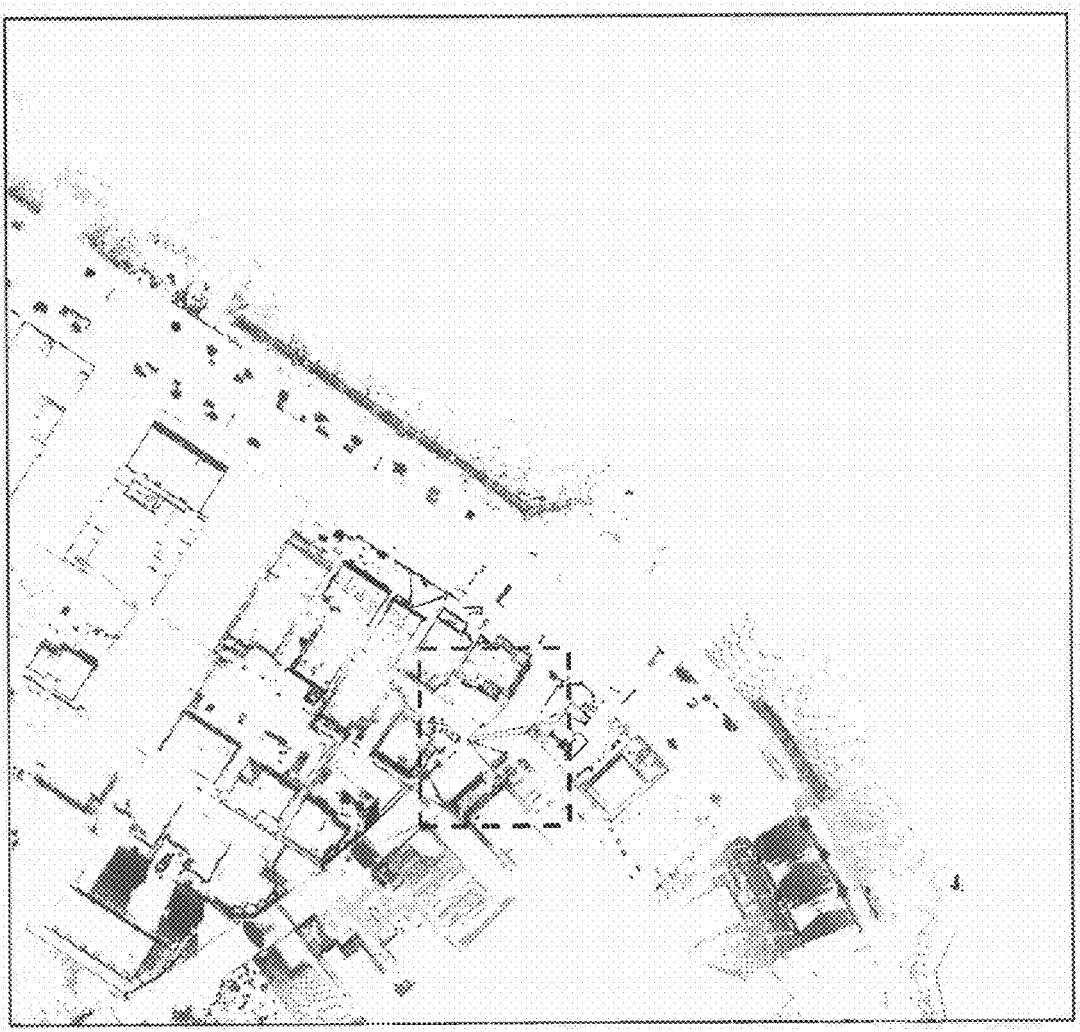
FIG. 17 shows the point cloud orthoimage 191 of a target area a (FIG. 6) onto which the predetermined height point cloud 129a whose height from the ground height 139a is the same or higher than 50 cm is orthographically projected.
Figure 18:
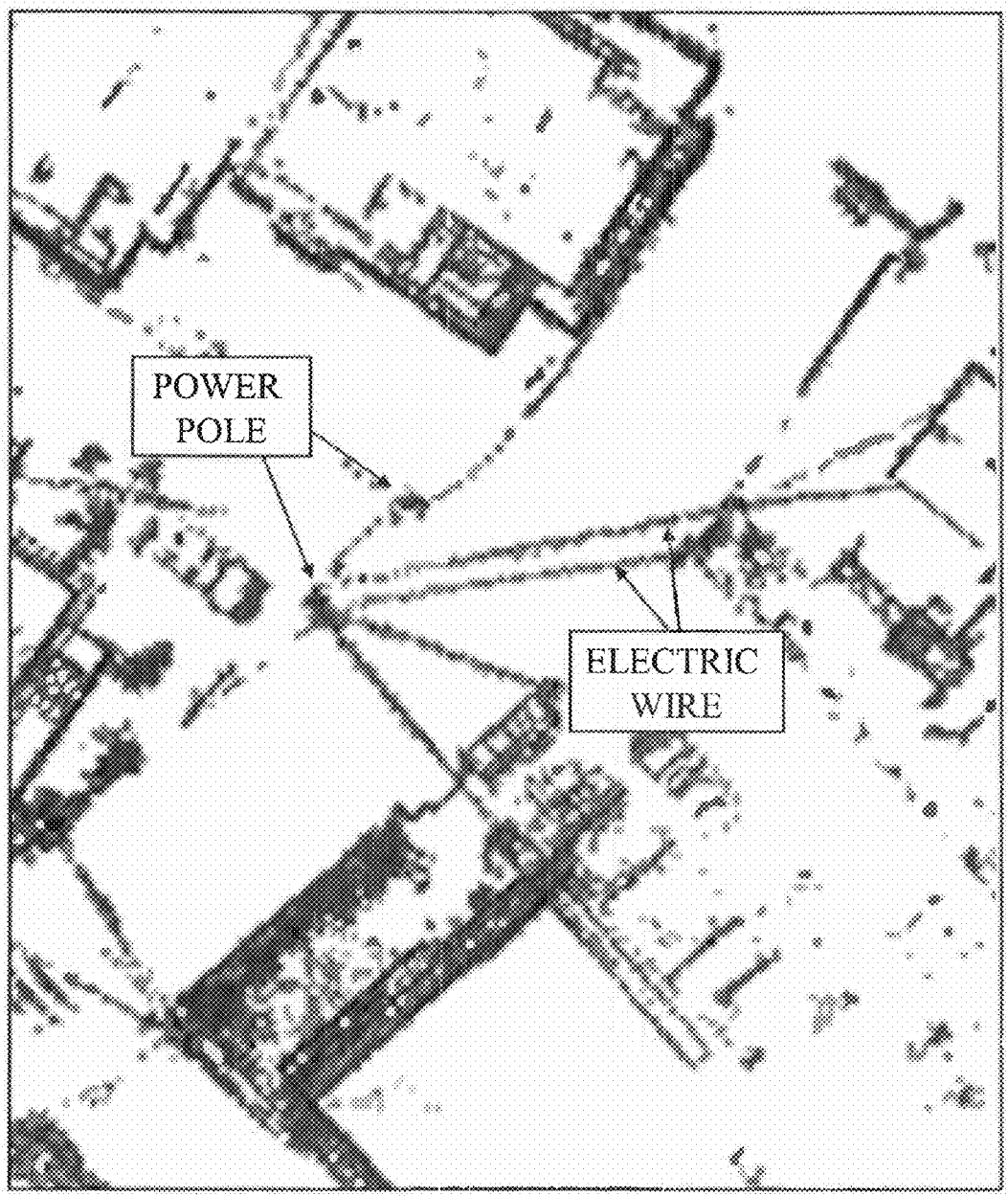

FIG. 17 shows the point cloud orthoimage 191 of the target area a (FIG. 6), and FIG. 18 shows a part of the target area a in close-up.

FIG. 15 to FIG. 18 each show the point cloud orthoimage 191 onto which the predetermined height point cloud 129a whose height from the ground height 139a is 50 cm or higher is orthographically projected exclusively, and therefore show no road surfaces.

As illustrated in FIG. 16 as the close-up of an area enclosed by a dashed line in FIG. 15 and FIG. 18 as the close-up of an area enclosed by the dashed line in FIG. 17, the point cloud orthoimage 191 clearly shows features such as a tree, a wall, an electric wire, and a power pole.

The point cloud orthoimage 191 may be shown in different colors according to point density. For example, the color may change from "red, green to white" as the density becomes higher. A feature standing upright like a power pole has a high density, and may therefore be indicated by a green point or a white point.

The use of the point cloud orthoimage 191 thus described may facilitate calculating the position of a standing feature, and thereby contribute to a greater reduction in time and labor in calculating the position of a standing feature, compared to the usual manual work.

FIG. 18 shows electric wires extending from the walls of houses and power poles. An electric wire may be used as a tool for discriminating between a power pole and a streetlight. If a target feature cannot be identified whether it is a power pole, a streetlight, or other standing features, then a user may operate the orthoimage generating apparatus 100, display the camera image 292 on the orthoimage generating apparatus 100 and confirm the target feature on the camera image 292. This may identify the feature correctly.

The orthoimage generating apparatus 100 of the third embodiment may also be described as follows.

The point cloud orthoimage 191 shows an image viewed from directly above. Therefore, a third dimensional feature (a standing feature) whose color is similar to the color of the ground, such as a power pole, becomes invisible. A third dimensional feature such as a power pole could be a key target in a road map.

Given this fact, the orthoimage generating apparatus 100 is configured to calculate the point density of the point cloud orthoimage 191 for each minute zone, and display minute zones in different degrees of brightness, colors, shapes, and the like according to point density.

Power poles and wall surfaces are usually built upright. Therefore, the point density of the point cloud orthoimage 191 onto which the point cloud 491 is vertically projected is high at a portion indicating a power pole or a wall surface. On the other hand, the density of a ground surface or the like is low because there is only one point in a vertical direction.

The point cloud orthoimage 191 thus shown in different degrees of brightness, colors, shapes, and the like according to point density may help facilitate identifying and detecting the location of a third dimensional feature such as a power pole.

The limited use of the storing section 490 exclusively for points whose height is the same or higher than the predetermined height for generating the point cloud orthoimage 191 may facilitate identifying and detecting a three dimensional feature.

Embodiment 4

A method for specifying the ground height 139a by the ground height specifying section 130 will be described in a fourth embodiment.

Example 1

The ground height specifying section 130 extracts a point whose height is the lowest of all the points showing latitude and longitude in a zone of the point cloud 491, and treats the height of an extracted point as the ground height 139a of that zone.

Figure 19:
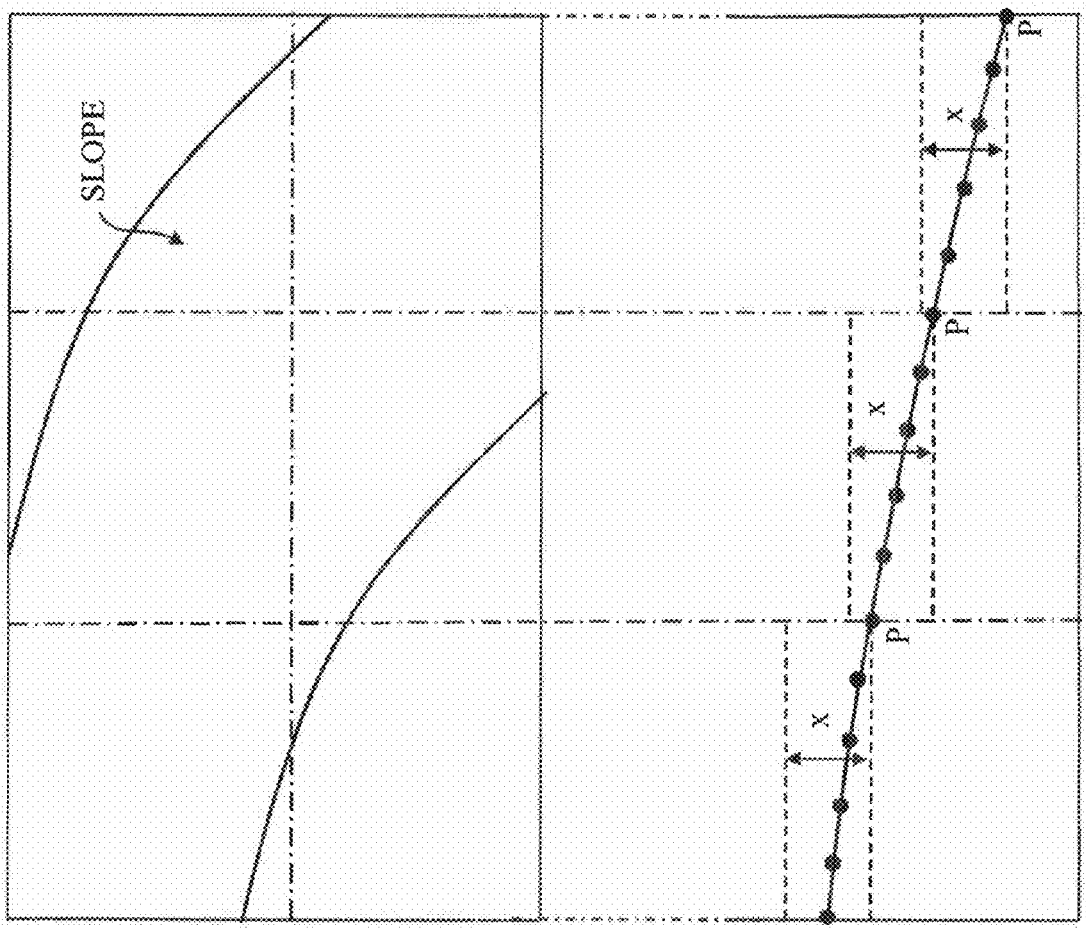
FIG. 19 illustrates a method for specifying the ground height 139a according to a fourth embodiment (Example 1)

FIG. 19 illustrates a method for specifying the ground height 139a according to the fourth embodiment (Example 1). FIG. 19 includes a top view illustrating a plan view of a slope and a bottom view illustrating a side view of the slope.

The ground height specifying section 130 divides a target area including a slope into meshes of a predetermined size (e.g., 100 m×100 m) according to latitude and longitude, as shown in the top view of FIG. 19. The ground height specifying section 130 extracts a point P whose height is the lowest of all the points in each zone as shown in the bottom view of FIG. 19. The ground height specifying section 130 treats the height of the 3D coordinates of the point P as the ground height 139a of that zone.

The point cloud extracting section 120 extracts from the point cloud 491 every point whose height from the point P (the ground height 139a) is the same or lower than a predetermined height x (e.g., 50 cm). This allows the point cloud projecting section 110 to generate the point cloud orthoimage 191 showing the slope.

Example 2

The ground height specifying section 130 extracts from the point cloud 491 every point indicating a curb of the road, and specifies the ground height 139*a* based on the 3D coordinates of each extracted point.

Figure 20:
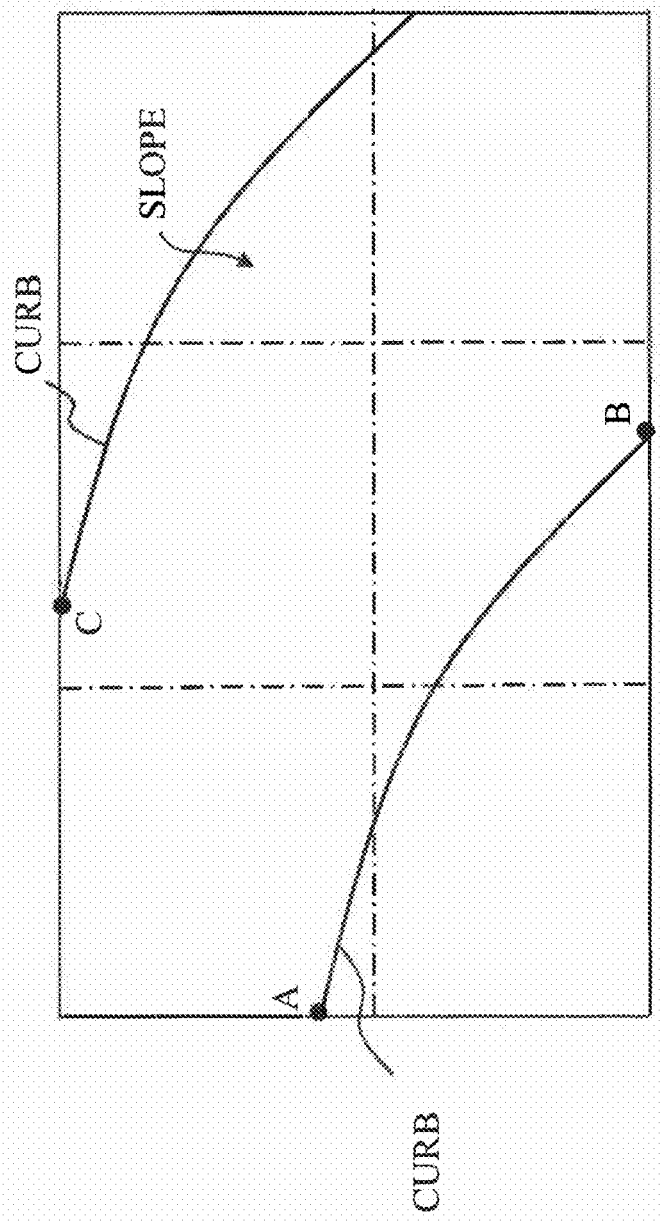
FIG. 20 illustrates a method for specifying the ground height 139a according to the fourth embodiment (Example 2)

FIG. 20 shows a method for specifying the ground height 139*a* according to the fourth embodiment (Example 2), illustrating a zone in a target area divided into zones of a predetermined size.

First, the ground height specifying section 130 specifies points indicating the curbs on both sides of a slope (portions of two curbs) based on the 3D coordinates of each point of the point cloud 491.

Then, the ground height specifying section 130 extracts a point A whose altitude is the highest and a point B whose altitude is the lowest of all the points indicating one of the curbs, and extracts a point C whose altitude is the highest of all the points indicating the other curb. Alternatively, the point C may be an arbitrary point indicating a point or curb whose height is the lowest.

The ground height specifying section 130 calculates a 3D equation of a plane including the point A, the point B, and the point C based on the 3D coordinates of the extracted three points A, B and C, as an equation indicating the inclination of a slope (hereinafter, referred to as a road surface equation).

The road surface equation calculated by the ground height specifying section 130 indicates the ground height 139*a* of a slope according to latitude and longitude.

The point cloud extracting section 120 specifies a zone in which each point of the point cloud 491 is located based on the latitude and longitude of each point, calculates the ground height 139*a* by substituting the latitude and longitude of each point into the road surface equation of that zone, and extracts the predetermined height point cloud 129*a* by comparing the calculated ground height 139*a* with the height of each point.

The following are different methods for specifying each point indicating a curb (hereinafter, referred to as a curb point cloud):
(1) a method for making a user select the three points, A, B and C of the curbs; and
(2) a method for specifying the curb point cloud based on discontinuity of the position of each point.

First, the method for making a user select the three points, A, B and C of the curbs (1) will be described.

The ground height specifying section 130 projects the point cloud 491 onto the camera image 292, displays on the display unit 901 the camera image 292 onto which the point cloud 491 is projected (a superimposed image of the point cloud 491 and the camera image 292), and makes the user select the three points A, B and C from among the points of the displayed point cloud 491, like S107 (FIG. 13) disclosed in Patent Document 1 (JP 2007-218705 A).

Then, the method for specifying the curb point cloud based on point discontinuity of the position of each point (2) will be described.

Figure 21:
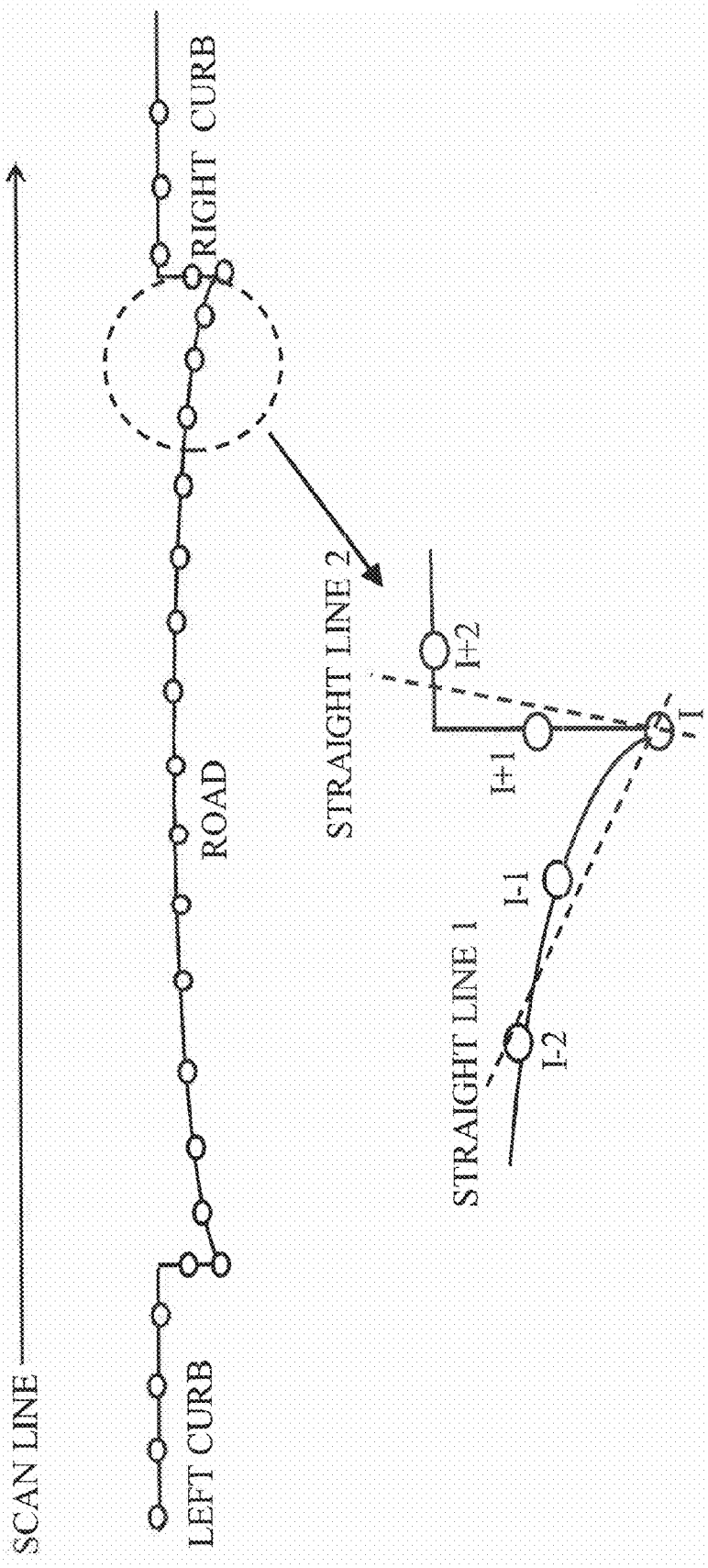
FIG. 21 illustrates a method for specifying a curb point cloud according to the fourth embodiment (Example 2)

FIG. 21 shows the method for specifying the curb point cloud according to the fourth embodiment (Example 2).

FIG. 21 includes a top view illustrating a vertical cross section of a road and curbs on the both sides, with latitude and longitude in a horizontal direction and height (altitude) in a vertical direction. FIG. 21 also includes a bottom view illustrating an area enclosed by the dashed line in the top view in close-up. Circles shown in the figure indicate points of the point cloud 491. Hereinafter, each circle is referred to as a "3D point". Each 3D point is measured one by one from left to right or right to left according to the movement of the mobile measuring apparatus 200. Hereinafter, a line connecting a plurality of 3D points in a horizontal row acquired through a measurement value from left to right or right to left will be referred to as a "scan line". Circles illustrated in FIG. 21 indicate a plurality of 3D points on a scan line from left to right.

Figure 22:
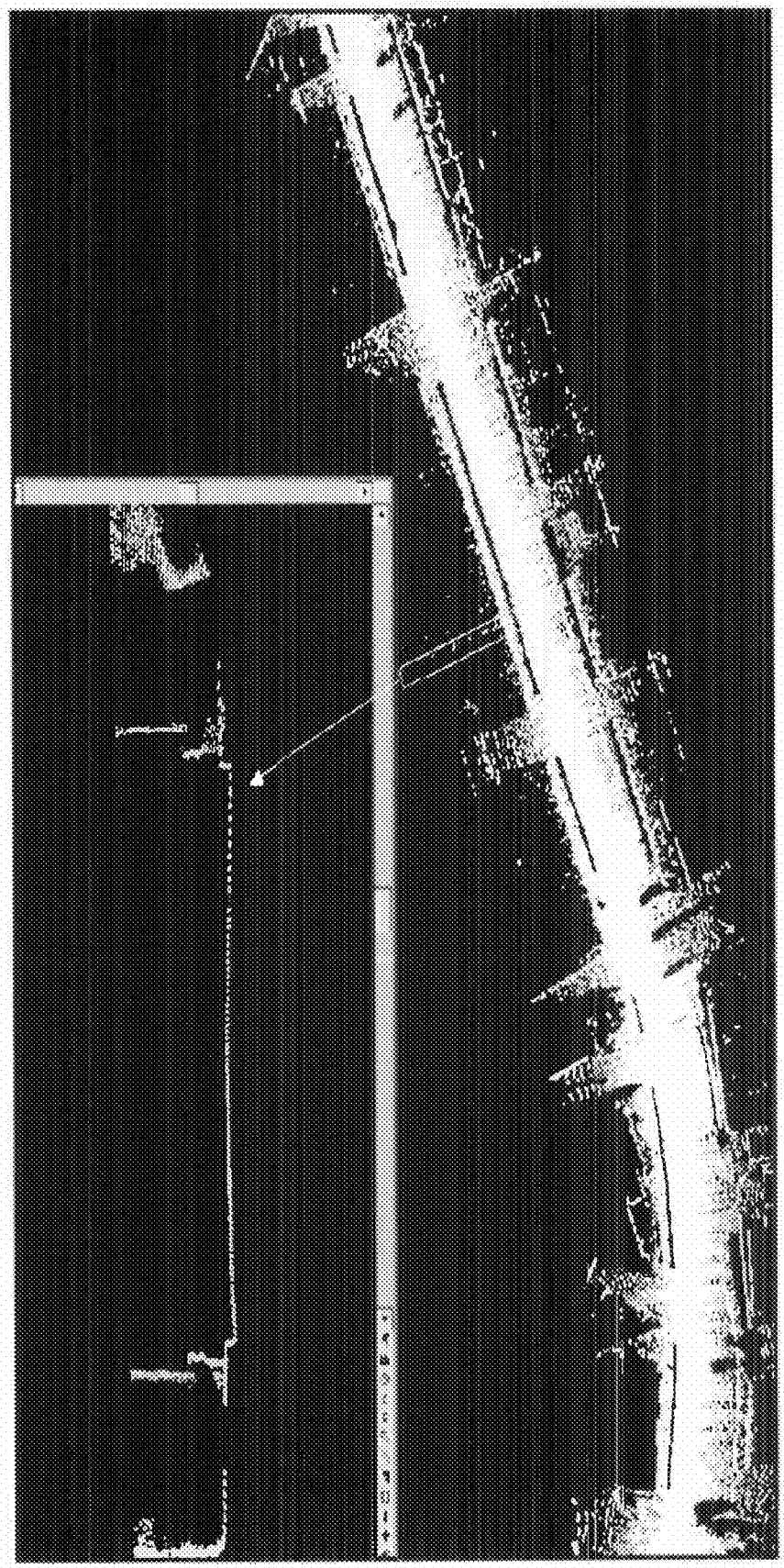
FIG. 22 illustrates a screen showing an image of the point cloud 491 including a road and curbs on each side of the road.

FIG. 22 shows a screen displaying an image of the point cloud 491 showing a road and curbs on the both sides.

FIG. 22 includes a main screen (a full screen) showing an image of a road surface based on the point cloud 491 (an example of the point cloud orthoimage 191), and a subscreen (a top left portion of the screen) showing an image of a vertical cross section of a side street based on a portion of the point cloud 491 extracted as a side street portion.

The image on the subscreen in FIG. 22 is an image of real data corresponding to the drawing of FIG. 21.

The ground height specifying section 130 calculates a straight line showing the degree of inclination of the said part based on consecutive 3D points arranged in order of measurement, and specifies a point where the road and the curb meet as a 3D point indicating a curb based on the amount of change in inclination shown by the calculated straight line.

For example, the ground height specifying section 130 calculates a straight line 1 based on the I-th, (I−1)-th, and (I−2)-th 3D points, and a straight line 2 based on the I-th, (I+1)-th, and (I+2)-th 3D points, with the I-th 3D point as the base point. Hereinafter, the x-th 3D point will be referred to as a "point x". The straight line 1 passes a point I, and also passes a point between a point I−1 and a point I−2. The straight line 2 passes the point I, and also passes a point between a point I+1 and a point I+2. Alternatively, the straight lines 1 and 2 may be calculated based on consecutive four or more 3D points (e.g., a point I−3 to the point I, or the point I to a point I+3), or based on two 3D points (e.g., the point I−1 and the point I, or the point I and the point I+1).

The ground height specifying section 130 specifies the 3D point of a curb based on an inclination difference (amount of change) between the straight line 1 and straight line 2 and a height difference among a plurality of 3D points of the straight line 2 (the straight line 1 in the case of the left side curb). The ground height specifying section 130 calculates the point I−1 or I+1 as the 3D point of the curb if the amount of change is the same or more than a predetermined amount, and the height difference between the point I and the point I+2 is the same or less than a predetermined value (e.g., 20 cm) corresponding to the height of the curb. The point I+2 is the 3D point having the largest height difference from the point I among the points I, I+1 and I+2 of the line 2. A road surface is usually inclined on the curb side, and therefore it would be desirable to select, as the 3D point of the curb, one of 3D points preceding or following the point I ( . . . , the point I−2, the point I−1, the point I+1, the point I+2, . . . ), and not the point I, to be used for calculating the ground height 139*a*. For example, the ground height specifying section 130 may select the point I−1 or I+1 as the 3D point of the curb. Alternatively, the point I may be selected as the 3D point of the curb.

The ground height specifying section 130 thus specifies the curb point cloud with each of the point cloud 491 as the base point.

Figure 23:
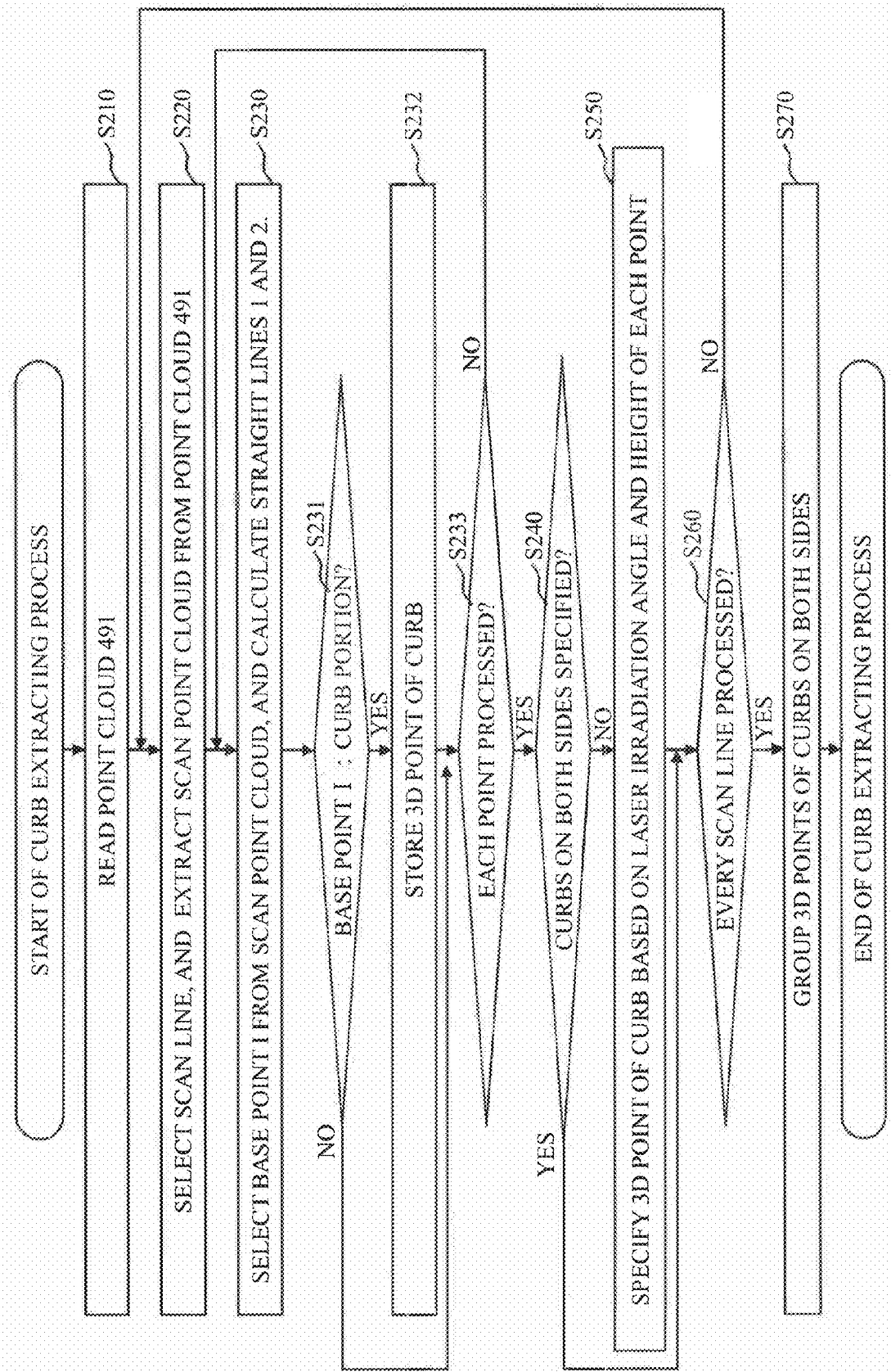
FIG. 23 shows a flow chart of a curb point cloud specifying method according to the fourth embodiment (Example 2)

FIG. 23 shows a flow chart of a curb point cloud specifying method according to the fourth embodiment (Example 2).

A process flow of the curb point cloud specifying method (FIG. 21) will be described below with reference to FIG. 23.

First, the ground height specifying section 130 reads the point cloud 491 (S210).

Then, the ground height specifying section 130 selects scan lines one by one, and extracts a plurality of 3D points on a selected scan line from the point cloud 491. Hereinafter, the plurality of extracted 3D points on the scan line will be referred to as a "scan point cloud" (S220).

The ground height specifying section 130 then selects a 3D point as the base point I from the extracted scan point cloud, and calculates the straight lines 1 and 2 passing the base point based on a plurality of consecutive points from the selected base point I (S230).

The ground height specifying section 130 then determines whether or not the base point I is a portion of curb based on the inclination difference between the straight lines 1 and 2, and the height difference among the 3D points of the straight line 2 (or the straight line 1) (S231).

The ground height specifying section 130 stores the 3D point of the curb (e.g., the point I−1 or I+1) when the base point I is determined to be the portion of curb (S232).

The ground height specifying section 130 repeats S230 through S232 on each point of the scan point cloud extracted in S220, and specifies and stores the 3D points of the curbs on the both sides (S233).

Furthermore, the ground height specifying section 130 specifies and stores the 3D points of the curbs on the both sides based on the angle of laser irradiation and the height of each point (S250) if the 3D points of the curbs cannot be specified in the processes of S230 through S233 (S240).

Specifically, the ground height specifying section 130 specifies the 3D point of the curb as follows.

First, the ground height specifying section 130 extracts from among the scan point cloud a plurality of 3D points whose angle of laser irradiation is close to the angle of laser irradiation of the 3D point of the curb specified by the previous scan line. For example, the ground height specifying section 130 may extract a point n−3 to a point n+3 on the scan line from the scan point cloud if the 3D point of the curb specified by the previous scan line is the n-th 3D point on the scan line.

The ground height specifying section 130 then stores as the 3D point of the curb a 3D point (one of the point n−3 to the point n+3) one or more points preceding or following the 3D point whose height is the lowest of all the plurality of extracted 3D points. Alternatively, the 3D point of the curb may be calculated under an additional condition that difference in angle of laser irradiation from the 3D point of the curb specified by the previous scan line is the same or less than a predetermined value (e.g., 1 degree).

The ground height specifying section 130 repeats S220 through S250 for every scan line (S260), and groups a plurality of 3D points of the left side curb and a plurality of 3D points of the right side curb, respectively (S270).

Figure 24:
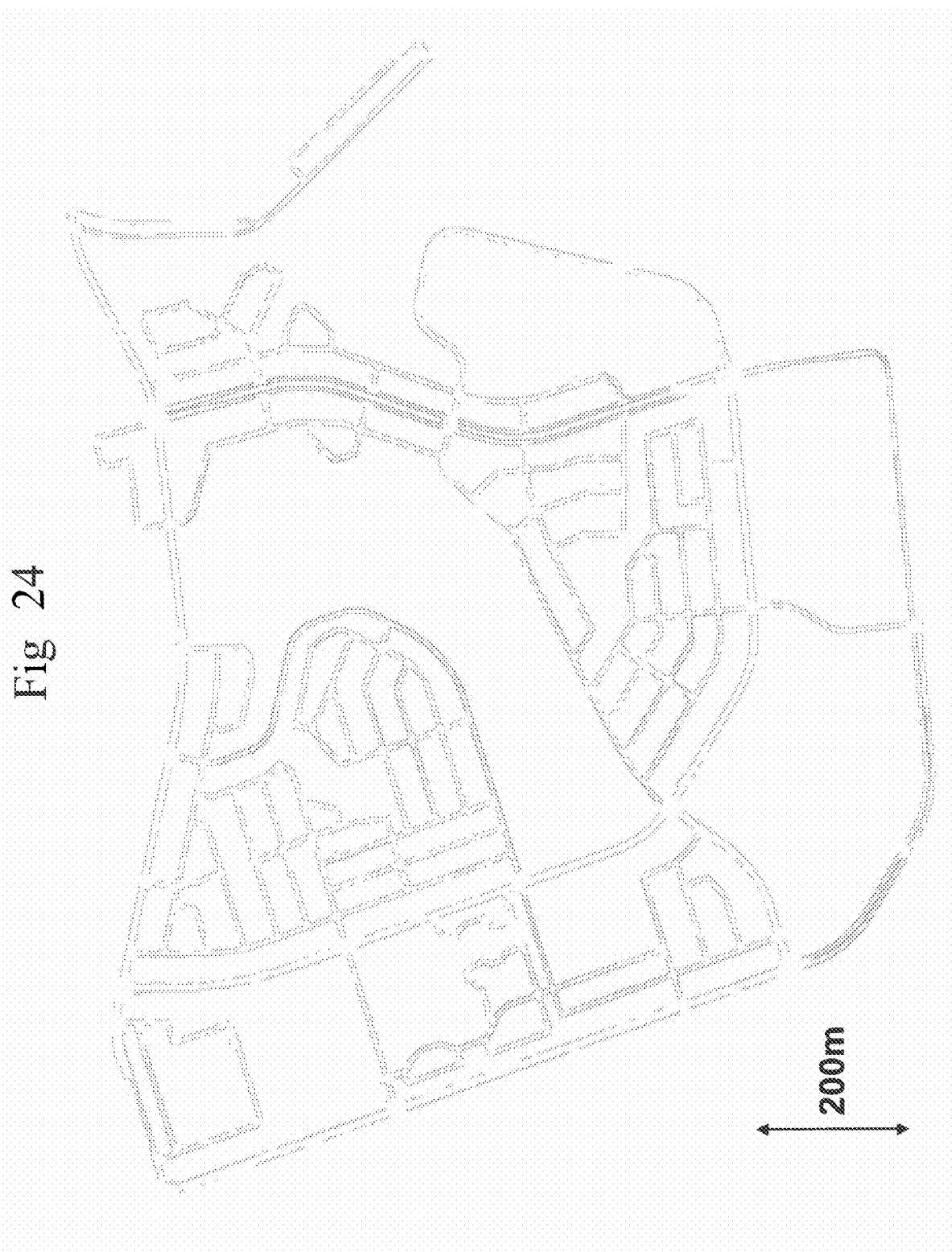
FIG. 24 shows the curb point cloud specified by the curb point cloud specifying method according to the fourth embodiment (Example 2)

FIG. 24 shows a curb point cloud specified by a curb point cloud specifying method according to the fourth embodiment (Example 2).

As shown in FIG. 24, the curb point cloud specified by the curb point cloud specifying method of the forth embodiment (Example 2) matches the road map of the target area illustrated in FIG. 5.

Example 3

The ground height specifying section 130 specifies the ground height 139a based on the height of a navigation reference point O of the mobile measuring apparatus 200.

The navigation reference point is the center of the coordinates of the mobile measuring apparatus 200 as described with reference to FIG. 2.

The following are methods for specifying the ground height 139a based on the height of the navigation reference point O of the mobile measuring apparatus 200:

(1) a method for specifying the ground height 139a by calculating a 3D equation of a road surface; and (2) a method for specifying the ground height 139a at each time of measurement.

Figure 25:
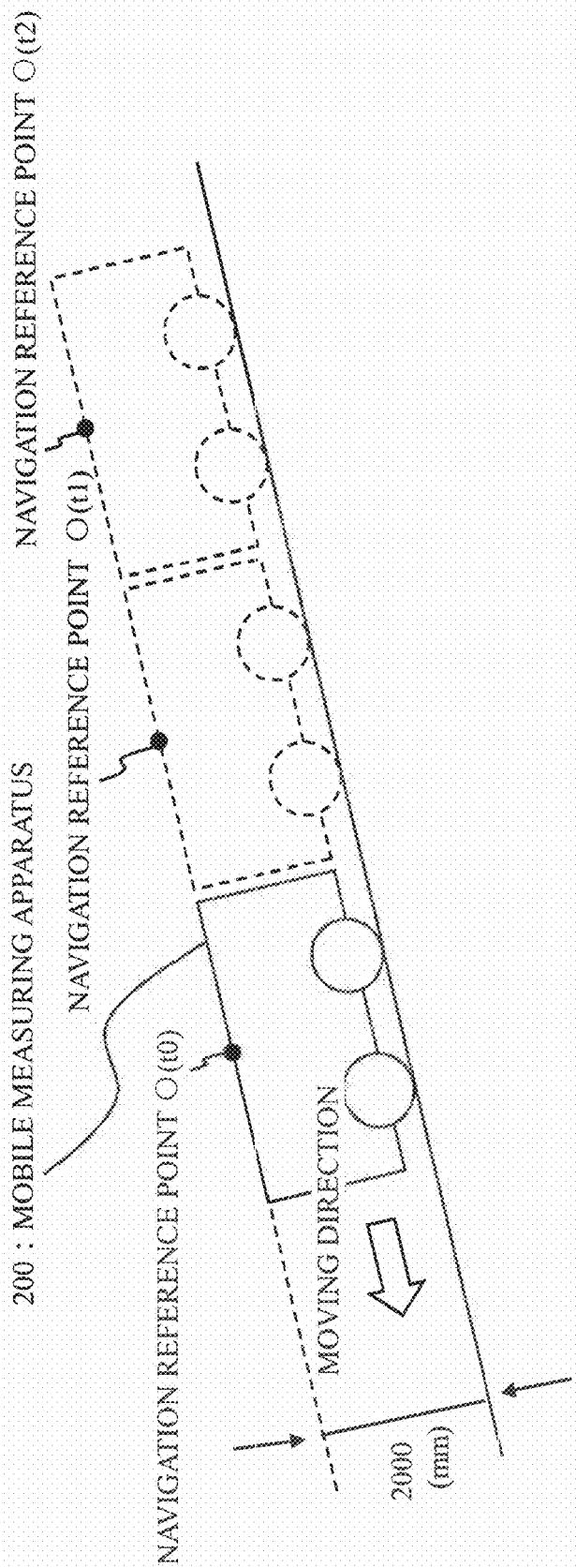
FIG. 25 illustrates a method for specifying the ground height 139a according to the fourth embodiment (Example 3 (1))

FIG. 25 shows the method of specifying the ground height 139a according to the fourth embodiment (Example 3 (1)).

(1) The method for specifying the ground height 139a by calculating a 3D equation of a road surface will be explained below with reference to FIG. 25.

It is assumed that the 3D coordinates of the navigation reference point O and each point of the point cloud 491 have been acquired at time t0, time t1, and time t2.

It is also assumed that the height from the ground surface of the previously measured navigation reference point O is 2000 mm.

The ground height specifying section 130 calculates as a 3D equation of a road surface the 3D equation of a plane that is 2000 mm lower than a plane passing each navigation reference point O (or a plane that is the closest to each navigation reference point O) based on the height of the navigation reference point O at time t0, time t1, and time t2. The ground height specifying section 130 calculates the ground height 139a by substituting the latitude and longitude of each point of the point cloud 491 into the 3D equation of the road surface.

FIG. 26 shows the method for specifying the ground height 139a according to the fourth embodiment (Example 3 (2)).

(2) The method for specifying the ground height 139a for each time of measurement will be explained below with reference to FIG. 26.

It is assumed that the 3D coordinates of the navigation reference point O and each point of the point cloud 491 have been acquired at each time.

It is also assumed that the height from the ground surface of the previously measured navigation reference point O is 2000 mm.

The ground height specifying section 130 calculates as the ground height 139a the height that is 2000 mm lower than the height of the navigation reference point O at the time of measurement of each point of the point cloud 491.

However, the following alternative may also be possible: The ground height specifying section 130 does not calculate the ground height 139a. The point cloud extracting section 120 calculates the height that is 1500 mm lower than the height of the navigation reference point O (height that is 500 mm above the ground surface [a predetermined height]) as a corrected separation reference height. Each point lower (or higher) than the corrected separation reference height is extracted from the point cloud 491 as the predetermined height point cloud 129a.

The respective specifying methods discussed in the fourth embodiment may allow the ground height specifying section 130 to calculate the ground height 139a accurately if the road is inclined.

Embodiment 5

The point cloud orthoimage 191 generated by the orthoimage generating apparatus 100 may be useful for generating a road map, for example.

A system generating a road map will be described in a fifth embodiment.

FIG. 27 shows a configuration of a map data generating system 801 according to the fifth embodiment.

The configuration of the map data generating system 801 of the fifth embodiment will be described below with reference to FIG. 27.

The map data generating system 801 includes a CAD apparatus 500 in addition to the configuration of the orthoimage generating system 800 discussed in the previous embodiments.

City planning maps showing roads and houses, street books recording road monopolies such as power poles, manholes, and advertisement towers, and appended maps of road management book recording road curbs, guardrails, signs, and the like have been used in road management. There has been a demand for improving the accuracy of the city planning maps, street books and appended maps to road management book.

The point cloud orthoimage 191 shows roads uncovered with high accuracy by removing features such as trees and tunnels covering oar hiding the roads (Embodiment 2). The point cloud orthoimage 191 also shows up standing features such as power poles and streetlights in a discriminatory manner (Embodiment 3). Therefore, the point cloud orthoimage 191 is useful for the generation of a city planning map, a street book, and an appended map of road management book.

The CAD apparatus 500 includes a CAD section 510 and a CAD storing section 590. The CAD apparatus 500 generates map data 591 (e.g., a city planning map, or an appended map of road management book) by using the point cloud orthoimage 191 generated by the orthoimage generating apparatus 100.

The CAD section 510 displays on the display unit 901 the point cloud orthoimage 191 and the camera image 292 in response to a user's operation and generates the map data, by using CPU.

The CAD storing section 590 stores the map data 591.

A user operates the CAD apparatus 500 by means of the keyboard 902 or the mouse 903 to display the point cloud orthoimage 191 generated in the second embodiment. The user then generates a road map by tracing roads displayed on the point cloud orthoimage 191, and stores a generated road map as the map data 591.

The user then displays the point cloud orthoimage 191 generated in the third embodiment, selects standing features shown in the displayed point cloud orthoimage 191 one by one, and displays the camera image 292 of a selected portion. The user then specifies the type of a standing feature based on the displayed camera image 292, and stores as the map data 591 the road map in which the position and type of each standing feature is set.

Alternatively, the CAD section 510 may extract roads and standing features not based on user's selections but based on image processing.

Thus, the use of the point cloud orthoimage 191a may allow the user to generate a city planning map or an appended map of road management book more easily than ever.

With further reference to this and the previous embodiments, the orthoimage generating apparatus 100, the mobile measuring apparatus 200, the position and attitude localizing apparatus 300, the point cloud generating apparatus 400, and the CAD apparatus 500 may alternatively be separate units or incorporated into a single unit.

Still alternatively, those apparatuses may be independent units not connected to one another via a network, or wired/wireless communication devices connected to a LAN or the Internet to exchange data with one another.

EXPLANATION OF REFERENCE SIGNS AND NUMERALS 100 point cloud orthoimage generating apparatus
110 point cloud projecting section
120 predetermined height point cloud extracting section
129a predetermined height point cloud
130 ground height specifying section
139a ground height
140 point cloud orthoimage display section
150 camera image display section
160 point density calculating section
169a point density
170 standing feature specifying section
179a standing feature image portion
180 standing feature discriminating section
190 image generating apparatus storing section
191 point cloud orthoimage
200 mobile measuring apparatus
201 top panel
202 vehicle
210 laser scanner
220 camera
230 GPS receiver
240 gyro (gyroscope)
250 odometer
290 measuring apparatus storing section
291 distance and orientation point cloud
292 camera image
293 GPS observation information
294 gyro measurement value
295 odometer measurement value
300 position and attitude localizing apparatus
310 position and attitude localizing section
390 localizing apparatus storing section
391 position and attitude localized value
400 point cloud generating apparatus
410 3D point cloud generating section
419a 3D point cloud
420 point cloud generating section
490 point cloud generating apparatus storing section
491 point cloud
500 CAD apparatus
510 CAD section
590 CAD storing section
591 map data
800 point cloud orthoimage generating system
801 map data generating system
901 display unit
902 keyboard
903 mouse
904 FDD
905 CDD
906 printer unit
907 scanner unit
908 microphone
909 speaker
911 CPU
912 bus
913 ROM
914 RAM
915 communication board
920 magnetic disk drive
921 OS
922 window system
923 program group
924 file group

The invention claimed is:

1. An aerial image generating apparatus for generating an aerial image of a ground surface by using a 3D point cloud indicating 3D coordinates of a spot on the ground, the aerial image generating apparatus comprising:

a 3D point cloud projecting section configured to generate the aerial image by projecting each point of the 3D point cloud onto a plane based on the 3D coordinates of each point indicated by the 3D point cloud by using a CPU (Central Processing Unit);

a ground height specifying section configured to specify points indicating curbs on each side of a road and to calculate a ground height via a 3D equation utilizing the specified points, the specified points including at least two points from points projected onto a first curb and at least one point from points projected onto a second curb; and a predetermined height point cloud extracting section configured to generate a predetermined height point cloud by extracting, from the 3D point cloud and based on the 3D coordinates of each point indicated by the 3D point cloud, points based on a comparison of each point to the ground height.

2. The aerial image generating apparatus according to claim 1, wherein the 3D point cloud projecting section generates the aerial image by projecting each point of the predetermined height point cloud onto the plane based on the 3D coordinates indicated by each point of the predetermined height point cloud extracted from the 3D point cloud.

3. The aerial image generating apparatus according to claim 2, wherein the predetermined height point cloud extracting section extracts a point whose height is the same or lower than a predetermined height as a member of the predetermined height point cloud.

4. The aerial image generating apparatus according to claim 3, wherein the predetermined height point cloud extracting section extracts a point whose height from the ground height is the same or lower than the predetermined height as a member of the predetermined height point cloud.

5. The aerial image generating apparatus according to claim 1, further comprising:
a point density calculating section configured to calculate a point density of each point of the 3D point cloud projected onto the plane by the 3D point cloud projecting section for each zone of the plane, the plane being divided into zones of a predetermined size, by using CPU;
a standing feature specifying section configured to specify an image portion of the aerial image showing a standing feature based on the point density calculated by the point density calculating section, by using CPU; and
a standing feature discriminating section configured to generate the aerial image in which the image portion specified by the standing feature specifying section is discriminated from other image portions, by using CPU.

6. The aerial image generating apparatus according to claim 5, wherein the 3D point cloud projecting section generates the aerial image by projecting each point of the predetermined height point cloud onto the plane based on the 3D coordinates of each point of the predetermined height point cloud extracted from the 3D point cloud.

7. The aerial image generating apparatus according to claim 6, wherein the predetermined height point cloud extracting section extracts a point whose height is the same or higher than the predetermined height as the predetermined height point cloud.

8. The aerial image generating apparatus according to claim 7, wherein the predetermined height point cloud extracting section extracts a point whose height from the ground height is the same or higher than the predetermined height as the predetermined height point cloud.

9. The aerial image generating apparatus according to claim 1, wherein the ground height specifying section specifies the ground height of each zone obtained by dividing by a predetermined size the plane onto which each point of 3D point cloud is projected by the 3D point cloud projecting section, based on the height of each point indicated by 3D point cloud projected onto each zone, and
wherein the predetermined height point cloud extracting section extracts the predetermined height point cloud for each zone based on the ground height of each zone specified by the ground height specifying section.

10. The aerial image generating apparatus according to claim 9, wherein the ground height specifying section extracts a predetermined number of points in order from the lowest of all the points of the 3D point cloud projected onto a first zone, and specifies the ground height of the first zone based on the height of the predetermined number of points extracted.

11. The aerial image generating apparatus according to claim 10, wherein the ground height specifying section extracts a point whose height is the lowest of all the points of the 3D point cloud projected onto the first zone, and treats the height of the extracted point as the ground height of the first zone.

12. The aerial image generating apparatus according to claim 1, wherein the 3D equation indicates a road surface based on the 3D coordinates of the extracted points, and the ground height specifying section calculates the height of the road surface as the ground height based on the calculated 3D equation.

13. The aerial image generating apparatus according to claim 1, further comprising:
an aerial image display section configured to display the generated aerial image on a display unit; and
a camera image display section configured to
specify a point projected onto a designated image portion of the aerial image displayed by the aerial image display section, and
display a camera image taken at a site of measurement where the specified point was measured, by using CPU.

14. The aerial image generating apparatus according to claim 1, wherein the 3D point cloud is generated based on a distance and orientation point cloud indicating distance and orientation to a point measured by a laser scanner installed in a vehicle.

15. The aerial image generating apparatus according to claim 1, wherein each point of the 3D point cloud indicates 3D coordinates and color of a feature at a position specified by the 3D coordinates.

16. An aerial image generating method for generating an aerial image of the ground surface by using a 3D point cloud indicating the 3D coordinates of a spot on the ground, the method comprising:
generating, via a processor, the aerial image by projecting each point of the 3D point cloud onto a plane based on the 3D coordinates of each point indicated by the 3D point cloud, by using a CPU (Central Processing Unit) in a 3D point cloud projecting process;
specifying points indicating curbs on each side of a road and calculating a ground height via a 3D equation utilizing the specified points, the specified points including at least two points from points projected onto a first curb and at least one point from points projected onto a second curb; and
generating a predetermined height point cloud by extracting, from the 3D point cloud and based on the 3D coordinates of each point indicated by the 3D point cloud, points based on a comparison of each point to the ground height.

17. The aerial image generating method according to claim 16, further comprising:
generating the aerial image by projecting each point of the predetermined height point cloud onto the plane based on the 3D coordinates of each point of the predetermined height point cloud extracted from the 3D point cloud.

18. The aerial image generating method according to claim 16, further comprising:
calculating a point density of each point of the 3D point cloud projected onto the plane for each zone of the plane divided into zones of a predetermined size, by using CPU, in a point density calculating process,
specifying an image portion of the aerial image showing a standing feature based on the point density calculated, by using CPU, in a standing feature specifying process, and
generating the aerial image in which the specified image portion is discriminated from other image portions, by using CPU, in a standing feature discriminating process.

19. A non-transitory computer-readable medium storing computer readable instructions thereon that when executed by a computer cause the computer to perform a method for generating an aerial image of a ground surface by using a 3D point cloud indicating 3D coordinates of a spot on the ground, the method comprising:
generating the aerial image by projecting each point of the 3D point cloud onto a plane based on the 3D coordinates of each point indicated by the 3D point cloud;
specifying points indicating curbs on each side of a road and calculating a ground height via a 3D equation utilizing the specified points, the specified points including at least two points from points projected onto a first curb and at least one point from points projected onto a second curb; and
generating a predetermined height point cloud by extracting, from the 3D point cloud and based on the 3D coordinates of each point indicated by the 3D point cloud, points based on a comparison of each point to the ground height.

* * * * *